United States Patent
Lammi et al.

(10) Patent No.: US 10,391,668 B2
(45) Date of Patent: Aug. 27, 2019

(54) FIREWOOD PROCESSORS

(71) Applicant: Laitilan Rautarakenne Oy, Laitila (FI)

(72) Inventors: Jori Lammi, Tampere (FI); Markus Vähä-Kouvola, Vinkkilä (FI)

(73) Assignee: LAITILAN RAUTARAKENNE OY, Laitila (FI)

( * ) Notice: Subject to any disclaimer, the term of this patent is extended or adjusted under 35 U.S.C. 154(b) by 644 days.

(21) Appl. No.: 15/019,486

(22) Filed: Feb. 9, 2016

(65) Prior Publication Data

US 2016/0229080 A1 Aug. 11, 2016

(30) Foreign Application Priority Data

Feb. 10, 2015 (EP) .................................... 15397504
Feb. 10, 2015 (EP) .................................... 15397505

(51) Int. Cl.
*B27L 7/06* (2006.01)
*B23D 59/00* (2006.01)
(Continued)

(52) U.S. Cl.
CPC .................. *B27L 7/06* (2013.01); *B07B 1/12* (2013.01); *B07B 1/40* (2013.01); *B23D 59/001* (2013.01); *B27L 7/00* (2013.01); *B27B 31/00* (2013.01)

(58) Field of Classification Search
CPC .................. B27L 7/00; B27L 7/06; B27L 7/08
See application file for complete search history.

(56) References Cited

U.S. PATENT DOCUMENTS 3,596,691 A * 8/1971 Broadfoot ................. B27L 7/00
144/195.1
4,157,105 A 6/1979 Gansley
(Continued)

FOREIGN PATENT DOCUMENTS

CH          237565 A     4/1945
DE    202011004286 U1   5/2011
(Continued)

OTHER PUBLICATIONS

The Forestry Forum, Cleaner Firewood?, Nov. 29, 2009, http://forestryforum.com/board/index.php?topic=40472.0, original post and reply #13.*

(Continued)

*Primary Examiner* — Matthew Katcoff
(74) *Attorney, Agent, or Firm* — Ziegler IP Law Group, LLC

(57) ABSTRACT

A firewood processor, comprising a saw, means for feeding wood for the saw, a splitting chute, a splitting wedge arranged to split a log, of which at least part is arranged in the splitting chute, into pieces, a pressure plate arranged to support the log, and means for moving the pressure plate and/or the splitting wedge towards each other in such a way that the log is configured to be split by said movement. In the firewood processor, the splitting wedge is arranged to split the log into an intermediate split log and at least one firewood-ready piece. The firewood processor further comprises a returning element for returning the intermediate split log back to the splitting chute for further splitting and a protector for protecting the user of the firewood processor. The firewood processor is configured to automatically return the intermediate split log, using the returning element, to the splitting chute.

23 Claims, 6 Drawing Sheets

(51) Int. Cl.
    *B07B 1/12*   (2006.01)
    *B27L 7/00*   (2006.01)
    *B07B 1/40*   (2006.01)
    *B27B 31/00*   (2006.01)

(56) References Cited

U.S. PATENT DOCUMENTS

| | | | |
|---|---|---|---|
| 4,173,237 A | | 11/1979 | Heikkinen et al. |
| 4,294,295 A | * | 10/1981 | Olin ............... B27B 5/18 144/195.1 |
| 4,478,263 A | | 10/1984 | Johnston |
| 4,869,303 A | * | 9/1989 | Nunnery ............ B27B 5/228 144/195.1 |
| 4,936,362 A | | 6/1990 | Heikkinen |
| 5,211,291 A | * | 5/1993 | Kelley ............. B07B 13/16 209/264 |
| 6,135,178 A | * | 10/2000 | Fager ............... B27L 7/00 144/193.1 |
| 7,228,881 B1 | * | 6/2007 | Smith ............ B27B 17/0091 144/193.1 |
| 9,623,584 B2 | * | 4/2017 | Sirkka ............... B27L 7/00 |
| 2011/0048580 A1 | | 3/2011 | Hicks |
| 2012/0298260 A1 | * | 11/2012 | Kamps ............... B27B 5/02 144/4.6 |

FOREIGN PATENT DOCUMENTS

| | | |
|---|---|---|
| DE | 202014008426 U1 | 11/2014 |
| EP | 1712336 A1 | 10/2006 |
| EP | 2407287 A1 | 1/2012 |
| EP | 2808140 A1 | 12/2014 |
| FR | 2956342 A1 | 8/2011 |
| WO | 9211408 A1 | 7/1992 |
| WO | 9301005 A1 | 1/1993 |
| WO | 9402261 A1 | 2/1994 |
| WO | 9964214 A1 | 12/1999 |
| WO | 2011141636 A1 | 11/2011 |

OTHER PUBLICATIONS

European Search Report for Application No./Patent No. 15397505.7-1709, dated Jul. 21, 2015, 8 pages.
European Search Report for Application No./Patent No. 15397504.0-1709, dated Jul. 21, 2015, 7 pages.

* cited by examiner

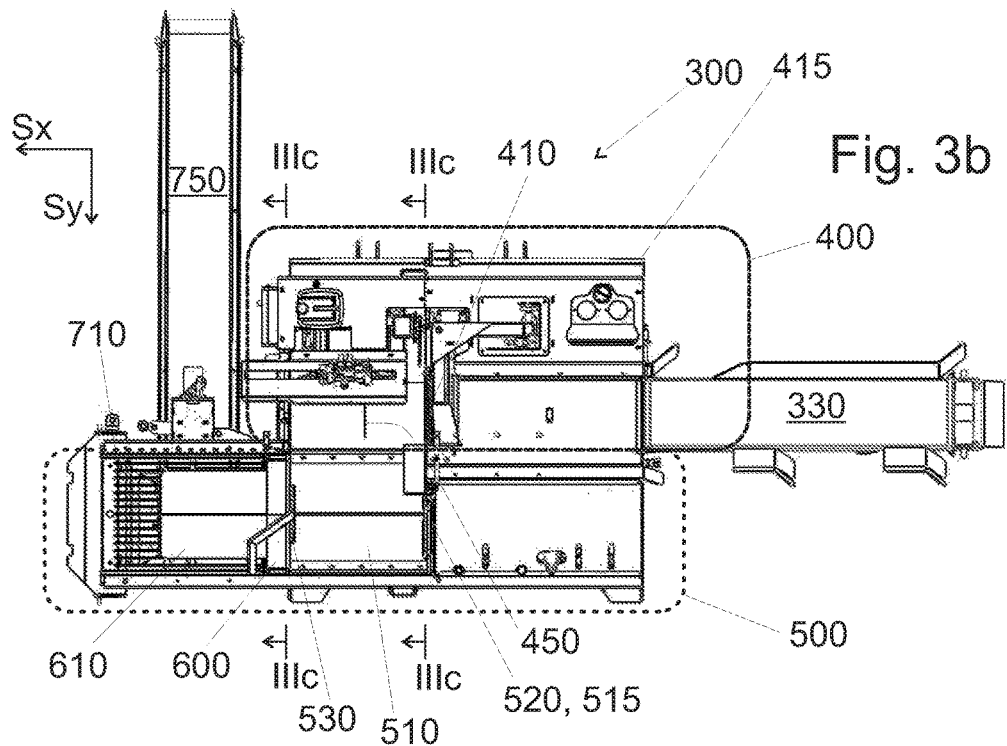
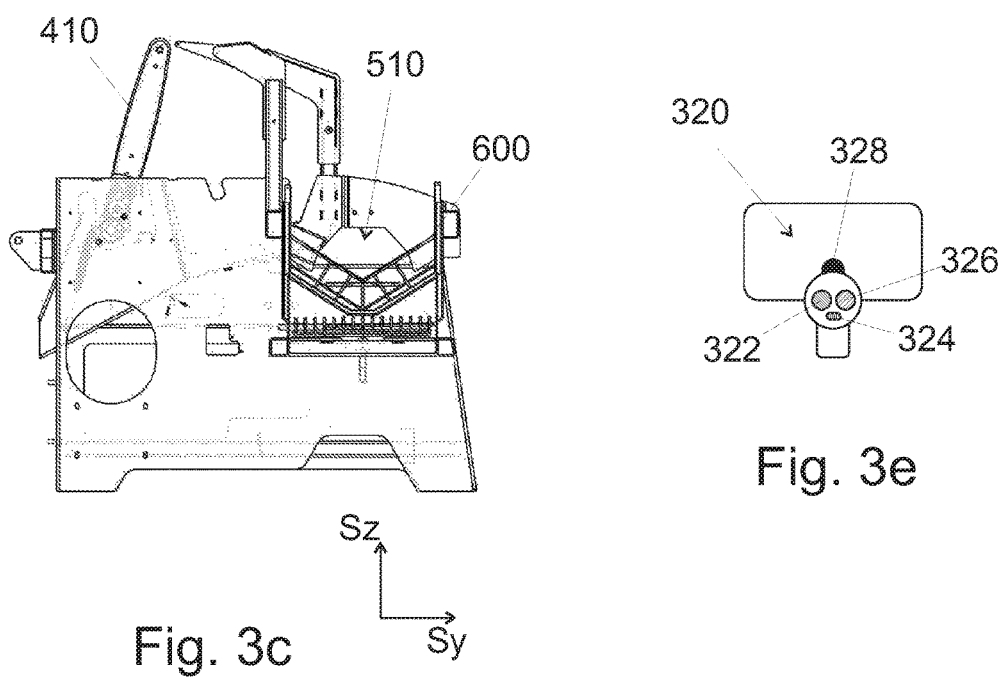

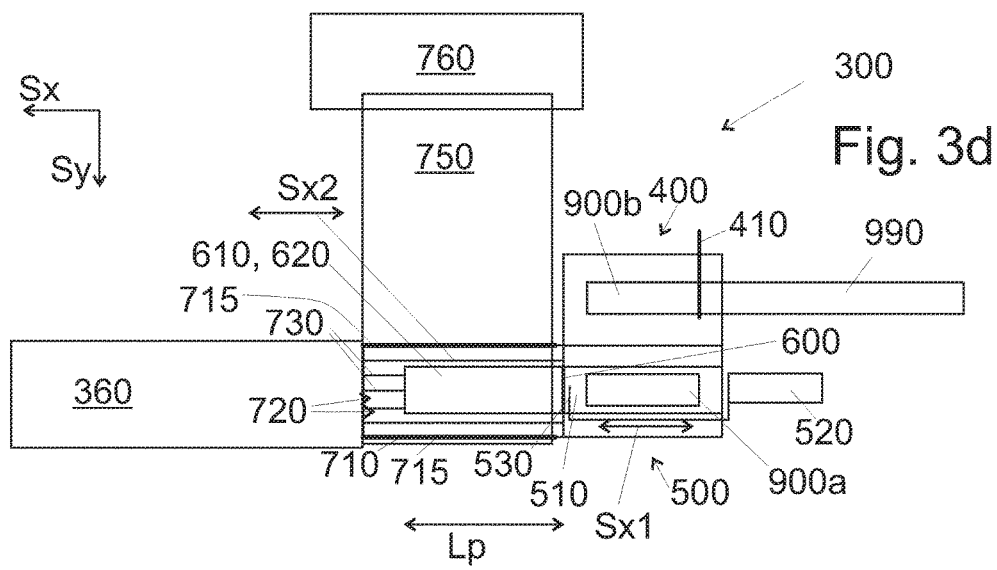
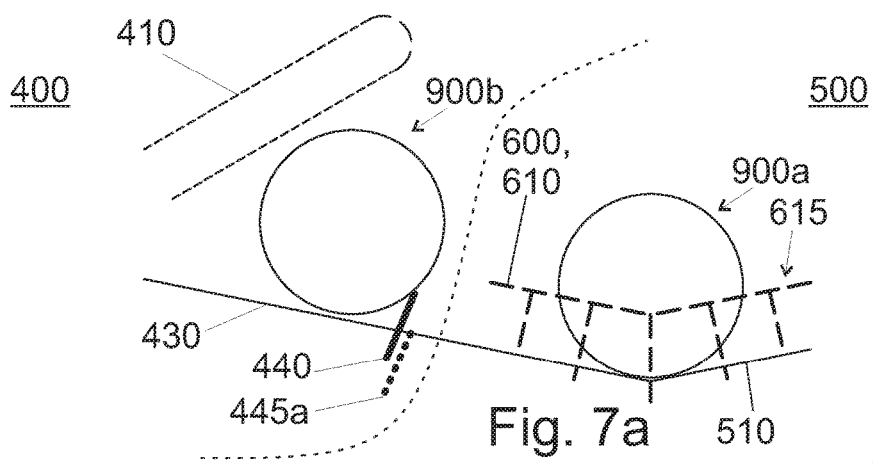
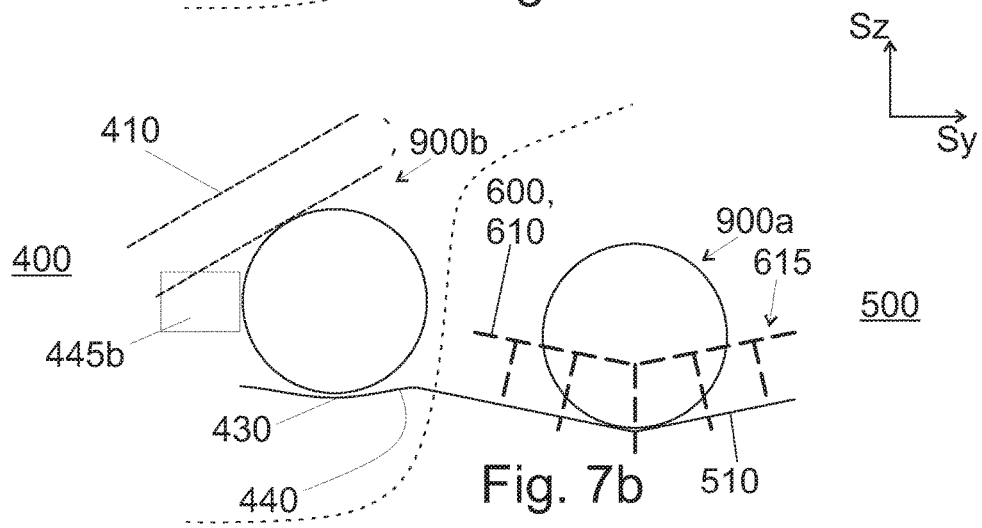

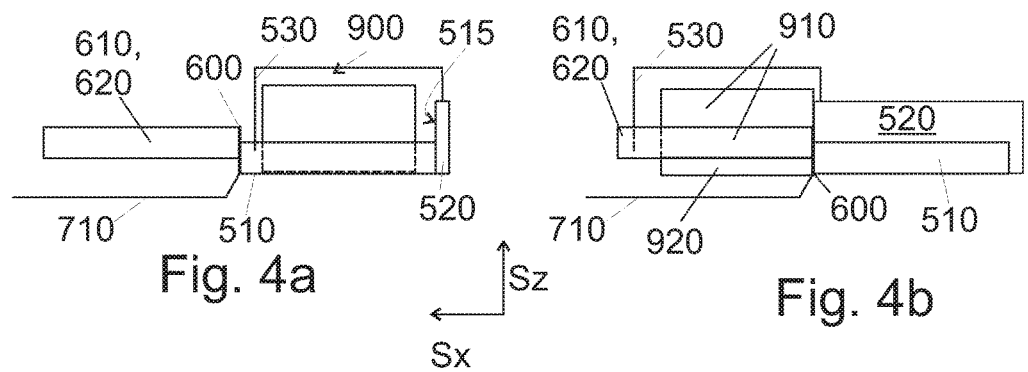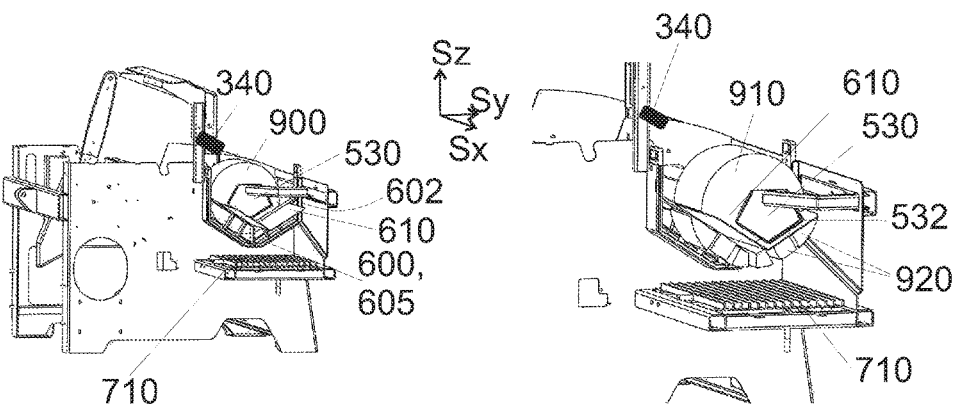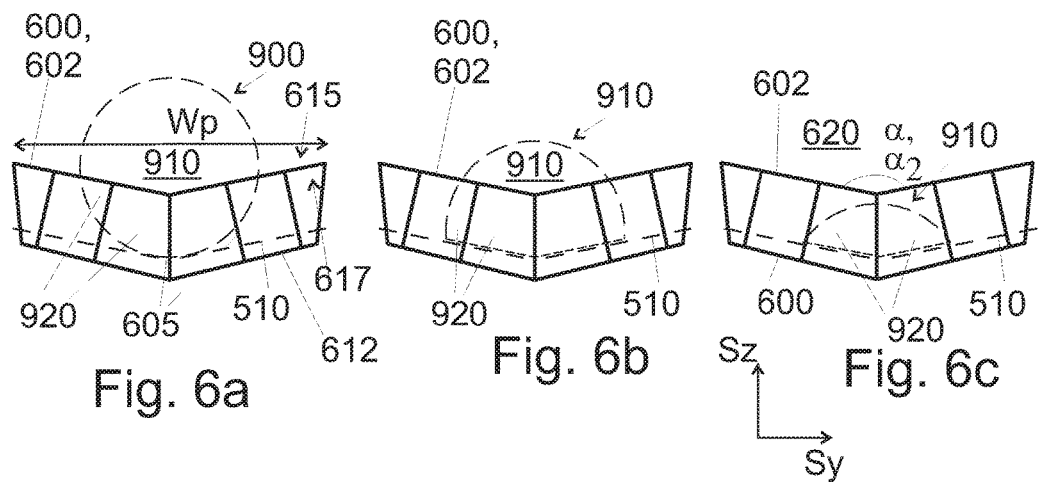

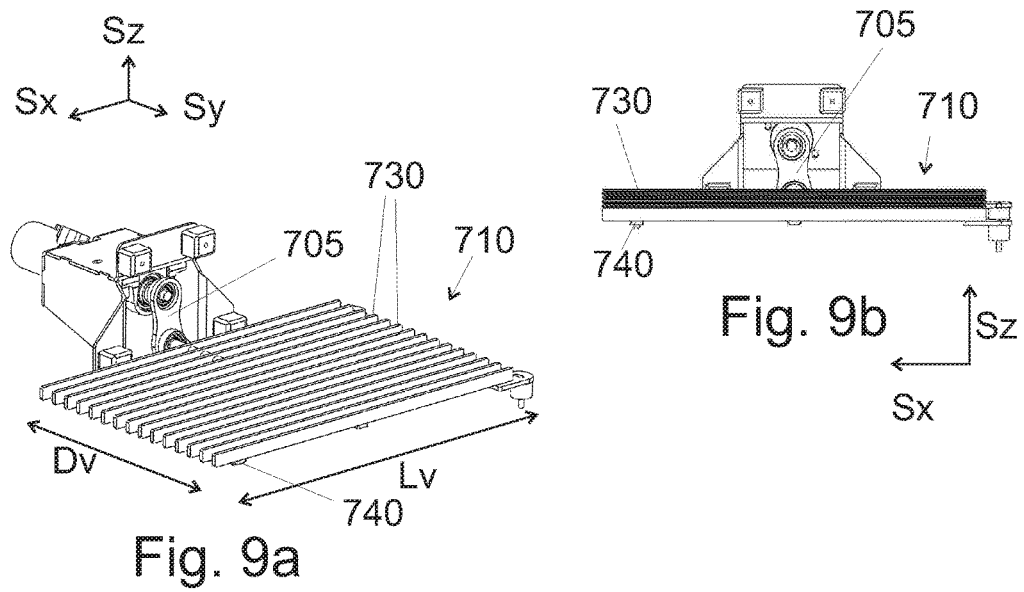
Fig. 9a
Fig. 9b
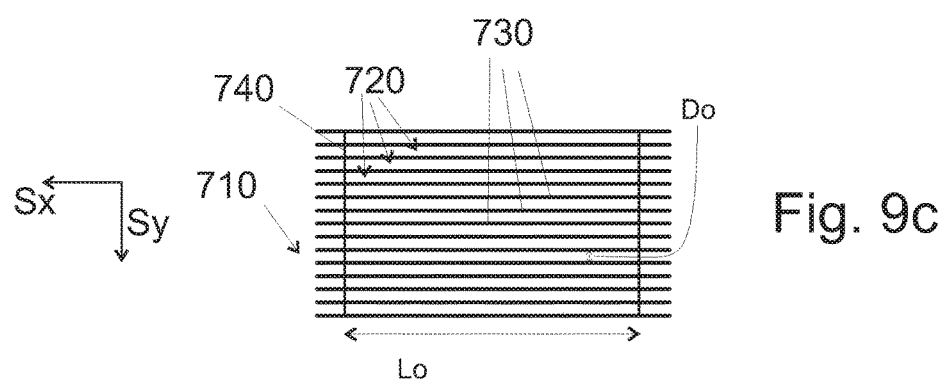
Fig. 9c
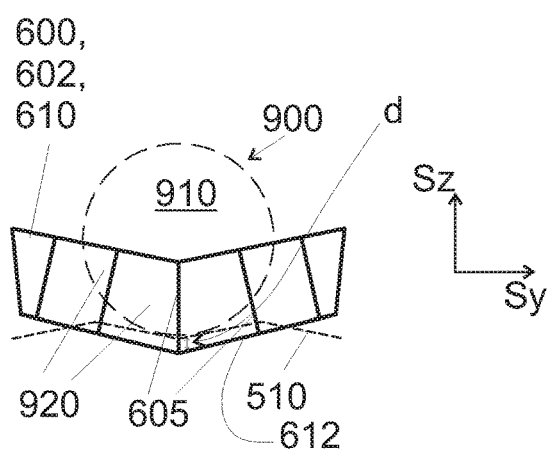
Fig. 10a
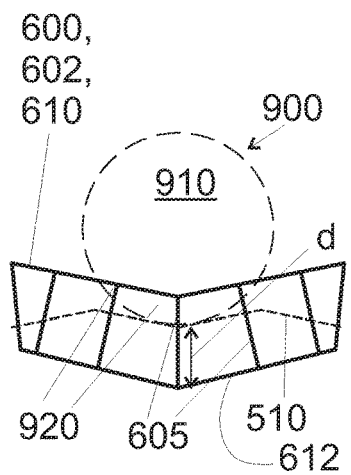
Fig. 10b

FIREWOOD PROCESSORS

FIELD OF INVENTION

The invention relates to firewood processors arranged to process wood to obtain firewood. An embodiment relates to firewood processors arranged to process long and/or thick wood to obtain firewood. An embodiment relates to firewood processors arranged to process wood to obtain clean firewood.

BACKGROUND

Firewood is used in fire places for heating. Firewood can be made from wood, such as logs, e.g. by using firewood processors. Firewood processors both cut (i.e. saw) and split wood to obtain firewood. A firewood processor is known e.g. from U.S. Pat. No. 4,173,237.

The quality of firewood depends e.g. on its size and the amount of impurities, such as debris, bark, and/or sawdust, intermixed with the firewood. Referring to FIGS. 1a-1c, firewood has usually a length, L, from 15 cm to 100 cm, mainly depending on national tradition and/or the size of the fireplace. Specific examples include 400 mm and 500 mm for typical boilers, and 330 mm and 250 mm for typical fireplaces. In addition, the transversal maximum measure of the firewood, herein called as the width of the firewood, should be reasonably small, depending on the class of the firewood. For example, for the classes "A1, D15", and "A2, D15" as defined in the standard EN 14961-5, the width of the firewood, D, should be at most 15 cm.

When the diameter of the un-split wood 100 (see FIGS. 2a-2c) is more than 15 cm, a one-way splitting wedge 110, as described in U.S. Pat. No. 4,173,237 and FIG. 2a, cannot be used to produce firewood having small width in one go. A splitting wedge 120 can be arranged to split a log to four parts (See. FIG. 2b), whereby somewhat thicker wood can be split to comply the width requirements for firewood. Theoretically, wood with a diameter of about 21 cm could be cut to sufficiently small firewood with such a splitting wedge. Moreover, theoretically, wood with a diameter of 30 cm could be cut to sufficiently small firewood with e.g. a splitting wedge arranged to split the wood to at least six pieces, the splitting wedge having only radial splitting parts, as the wedge of FIG. 2b. In practice, however, it is hard to align the center of the splitting wedge with the center of the log to be split. Moreover, the grains of a log are not precisely parallel to the length, whereby the log will not split ideally along its central axis. The splitting wedge 120 can be arranged in a frame 122. The size of the frame 122 is selected large enough for the wood 100, so that so that split wood can move radially outwards in the open sections "O" of the splitting wedge, as depicted in FIG. 2b.

When the diameter of the un-split wood 100 is even larger, such as about 30 cm or more, such a splitting wedge is not able to split the wood to sufficiently small firewood in one go. Naturally, it is possible to manually detect and pick too large pieces of wood, and re-split them with the same wedge. This, however, considerably slows down the process. Furthermore, moving large pieces of wood manually may be problematic from a point of view of safety or ergonomics. Moreover, any splitting wedge, wherein the wedges extend only radially cannot be used for the purpose, since the width of the firewood would always be too large. However, it is known in the art to use a splitting wedge 130 that has also bridging parts 134, i.e. parts that extend in the tangential direction. An example of such a wedge is shown in FIG. 2c.

The problem with splitting wedges 130 having also bridging parts 134 is that when such a wedge is used, the force required to split the log increases a lot. This is mainly because the central pieces of firewood must move through the central apertures "C" of the splitting wedge 130, and therein the movement of the split firewood is limited also from outwards. In contrast, when using e.g. a four-way wedge, as above, the pieces of firewood may move radially away from the center (see FIG. 2b). It is also noted the radially outmost parts of the splitting wedge 130 of FIG. 2c are open, as denoted by the letter "O". This applies when a frame 122 that is larger than the log is used to support the blades of the splitting wedge, as depicted in FIG. 2b, because the log 100 is relatively thin compared to the frame 122.

The need for large splitting forces impose other problems: the piston for moving the log towards the splitting wedge must be capable of producing the force, and the frame of the firewood processor must be so sturdy that it withstands the forces. In practice this means larger machine parts and a larger firewood processor, which considerably increases the manufacturing and transportation costs for the firewood processor. Moreover, the operation of the firewood processor may slow down, if the size hydraulic pumps are not increased correspondingly. In addition, larger pumps need more energy.

In addition, the processed firewood should be clean. For the purpose it is known to convey the firewood to a sieving drum before packing the firewood. However, sieving drums are reasonably long, in order to ensure sufficient amount of cleaning. A long sieving drum requires a reasonably amount a material, whereby its manufacturing cost may be reasonably high. Moreover, provided that a conveyor for firewood is needed, the sieving drum should be installed in between such conveyor and the firewood processor, which makes the assembly of such a system more complex than a sieving means that is integrated directly to the firewood processor.

SUMMARY OF THE INVENTION

It is the aim of the present invention to present a firewood processor, by which the aforementioned problems are diminished.

As for the first problem, in an embodiment of the invention, the firewood processor is arranged to split a log and re-split the log as many times as needed to make preferred type of firewood, such as A1 D15. However, if firewood is made from thin wood, the log may be split only once. In an embodiment, the firewood processor is arranged to split a log at least two times. In this way, a splitting wedge without the closed parts "C" can be used to split the log into at least one firewood-ready piece and to at least one intermediate split log. The intermediate split log(s) can then be split again to form either (i) only further firewood-ready pieces or (ii) at least one smaller intermediate split log and some further firewood-ready pieces. If needed, the smaller intermediate split can be split again, until the whole log has been split to firewood-ready pieces. The firewood processor is disclosed in claim 1 and in the appended examples, in particular in the examples 101 to 122.

As for the second problem, in an embodiment of the invention, the firewood processor comprises a vibrator screen arranged to screen debris, bark, sawdust, and/or other impurities from the firewood-ready pieces of wood. The firewood processor further comprises means for vibrating the vibrator screen. Moreover the vibrator screen is arranged to such a location that the vibrator screen is configured to receive pieces of the log from a splitting unit of the firewood processor. The firewood processor is disclosed in the appended examples, in particular the examples 199 to 219.

BRIEF DESCRIPTION OF DRAWINGS

FIGS. 3a-3d show a firewood processor 300 in various views,

FIG. 3e shows a controller of a firewood processor, as seen from top,

FIGS. 4a-4b show, in a side view, some parts of a splitting unit 500 of a firewood processor 300, and the process of splitting, FIGS. 5a-5b show, in a perspective view, some parts of a splitting unit 500 of a firewood processor 300, and the process of splitting, FIGS. 6a-6c show, in an end view, three subsequent splittings, whereby a reasonably large log 900 is split eventually to only firewood-ready pieces 920, FIGS. 7a-7b show, in an end view, examples of a mutual positions of a cutting unit 400 and a splitting unit 500, FIGS. 9a-9c show, in a perspective view, a side view, and a top view, respectively, a vibrator screen 710 for cleaning firewood; and FIGS. 10a-10b show, in an end view, some mutual vertical orientations of the splitting chute 510 and the splitting wedge 600.

DETAILED DESCRIPTION OF EMBODIMENTS

Embodiments of processes for producing firewood are shown in FIGS. 8a-8d. As for the terms used in this description, the term wood 990 refers to a relatively long wooden object, such as a tree trunk 990, which is to be processed to firewood (i.e. firewood-ready pieces 920 or clean firewood 930). The length of the wood 990 may be e.g. at least 2.5 m.

Figure 1A:
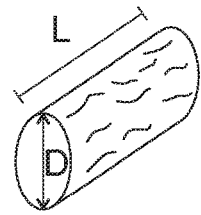
FIGS. 1a-1c show examples of firewood and measures thereof.
Figure 1B:
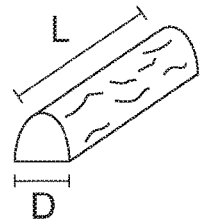
Figure 1C:
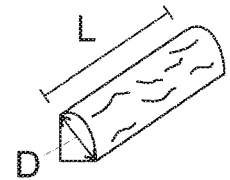

The term log 900 refers to a piece that is sawn (i.e. cut) from the wood 990. The length L (see FIGS. 1a-1c) of a log depends on the need, and the length of the log 900 determines the length of the firewood. The length L may be e.g. from 15 cm to 100 cm. The aforementioned examples of background art apply.

Figure 8A:
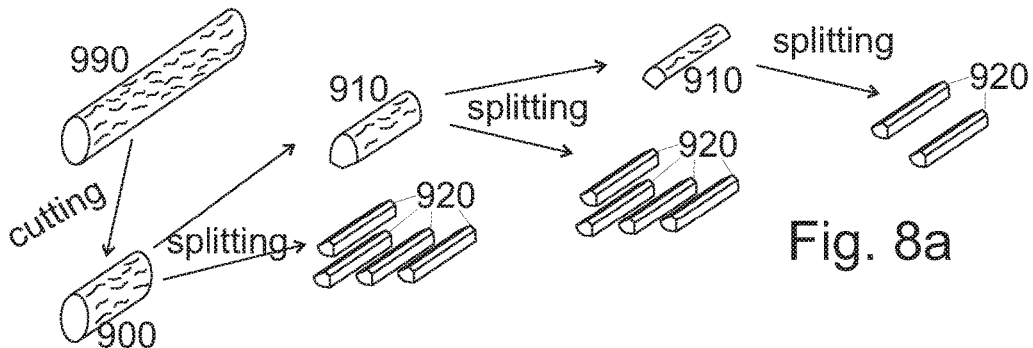
FIGS. 8a-8d show some embodiments of a splitting process.
Figure 8B:
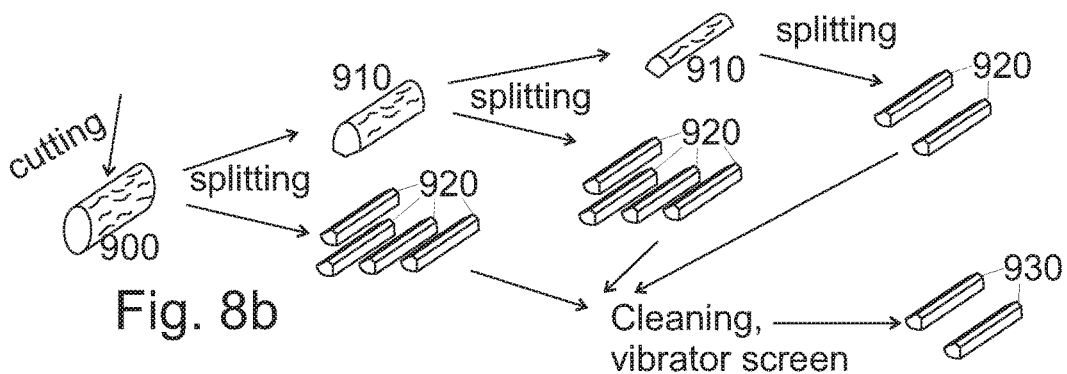
Figure 8C:
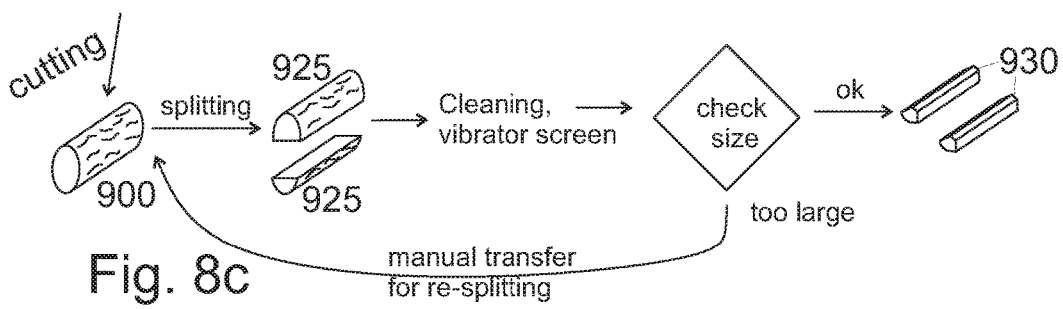
Figure 8D:
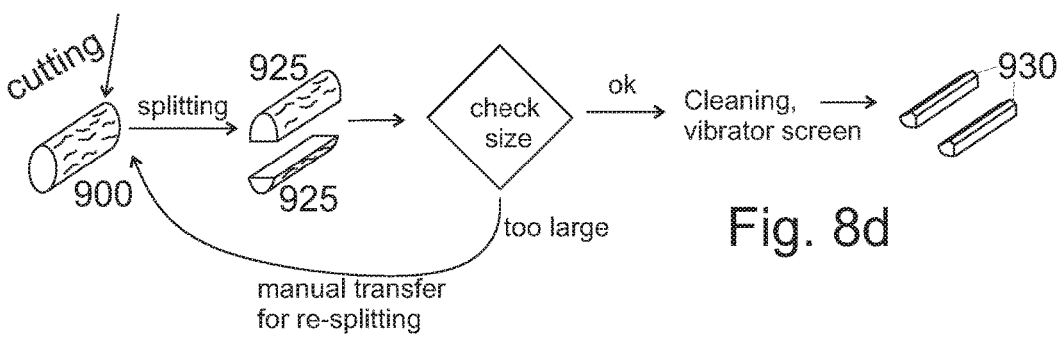

When the log 900 is split, at least two pieces 925 (or 910, 920) of log are formed. No special size requirements apply to these pieces 925. An embodiment of splitting is depicted in FIGS. 8c and 8d, wherein too large pieces 925 of wood are manually transferred back for re-splitting. As depicted in FIGS. 8a and 8b, in an embodiment, the log is automatically split subsequently at least two times. In this embodiment, the log 900 is split to at least one intermediate split log 910, and at least one firewood-ready piece 920. The intermediate split log 910 refers to a log 900 that has been split at least once, which intermediate split log 910 is automatically transferred for re-splitting, and may be split at least once again. The width D (see FIGS. 1a-1c) of the firewood-ready piece 920 is such that it needs not to be re-split to comply with the size requirements of firewood. For example, the width D of the firewood-ready pieces 920 may be e.g. at most 15 cm.

In contrast to firewood-ready pieces 920, the intermediate split log 910 (or intermediate split logs) is/are returned for re-splitting, e.g. as shown in FIGS. 4a-6c. Thus, the width of the intermediate split log 910 may be greater than the width of the firewood-ready piece 920. However, it is possible that the size of the intermediate split log(s) 910 is so small that it will not be re-split. E.g. it may penetrate through an opening of a splitting wedge without being split (see FIG. 6c).

The firewood-ready pieces 920 and/or the pieces 925 of log can be cleaned. Provided that the size requirements are met, clean firewood 930 is thus produced. Provided that the size requirements are not met, in an embodiment too large pieces 925 of log can be e.g. manually sent for re-splitting (see FIGS. 8c and 8d). Naturally, such manual control is not needed, when the firewood processor 300 is arranged to automatically re-split all such pieces that are or may be too large (see FIGS. 8a and 8b).

The term "processed firewood" will be used to refer to one of pieces 925 of log, firewood-ready pieces 920, and clean firewood 930, or a mixture thereof. In addition, a large piece 925 of log can be interpreted to mean an intermediate split log 910, as such a piece (925, 910) could also manually be transferred for re-splitting (see FIGS. 8c and 8d).

FIGS. 3a, 3b, 3c, and 3d show a firewood processor 300 in a perspective view, top view, an end view, and a top view, respectively. The directions Sx, Sy, and Sz refer to three orthogonal directions. Sz may be parallel to the surface normal of the ground, on which the firewood processor stands. The firewood processor 300 comprises a frame supporting the parts of the firewood processor. The frame is configured to stand, e.g. on ground, while operating the firewood processor 300.

The firewood processor 300 comprises a cutting unit 400 and a splitting unit 500. The cutting unit 400 comprises a saw 410 for cutting (i.e. sawing) wood 990 to logs 900, 900b, 900a (see FIG. 3d). The cutting unit 400 is configured to cut the wood 990 to logs 900 having a desired length using the saw 410, as discussed above. The firewood processor 300 comprises means 330 for feeding wood 990 to the cutting unit 400. The means 330 may comprise at least one of a table, such as a roller table, and a conveyor, such as a belt conveyor. In addition or alternatively, a separate (optionally additional) means 330 for feeding wood 990 can be used when arranged in connection with a firewood processor. Also the separate means 330 may comprise a wood conveyor. Thus, an arrangement comprises a firewood processor 300 and a wood conveyor 330 for conveying uncut wood 990 to the cutting unit 400. The firewood processor may comprise a controller 320, with which the operator can operate the conveyor 330 for moving wood 990 to the cutting unit 400.

The conveyor 330 or the firewood processor 300 may comprise an opening or gate, through which the wood 990 is fed to the saw 410. In an embodiment, the width of the opening or the gate is selected such that the opening or the gate is configured to pass only sufficiently thin wood 990 to the saw 410. A too thick log 900 might cause malfunction of the firewood processor 300. The width of the opening or gate may be e.g. from 370 mm to 900 mm, such as 380 mm, 410 mm, 440 mm, 470 mm, 500 mm, 530 mm, 560 mm, or 600 mm. The width of the opening or gate may be e.g. from 370 mm to any one of 440 mm, 470 mm, 500 mm, 530 mm, 560 mm, 600 mm, 700 mm, or 800 mm. The width depends on the structure of the other components of the firewood processor 300, in combination determining the maximum thickness of the wood 990 the firewood processor 300 can process. The gate may be arranged at a location e.g. 50 cm-100 cm before the saw 410, in the direction of the means 330 for feeding wood 990 to the saw 410 and away from the cutting unit 400. In addition or alternatively, the saw 410 can be configured such that it can cut only sufficiently thin wood. Examples of limiting thicknesses are the same as for the opening of the gate. This can be done e.g. by preventing the saw 410 from rising higher than the limiting thickness, as measured from the top surface of the conveyor 330. In addition or alternatively, the length of the saw 410 may be configured to be so short that it cannot fully cut too thick wood 990.

The cutting unit 400 may comprise means for adjusting the position of the wood 990 in such a way that wood is cut to logs 900 having a desired length. The means may comprise a body 450 (FIG. 3b), to which an end of the wood 990 can be supported, whereby to position of the saw 410, with respect to this body 450, determines the length L of the cut log 900. The distance between the body 450 and the saw may be configured to be variable and temporarily fixable. In particular, the position of the body 450 with respect to a frame of the firewood processor 300 (and thus also with respect to ground) may be configured to be variable and temporarily fixable. The firewood processor 300 comprises a protector 420 arranged to protect the user from the saw 410.

Referring to FIGS. 3b and 3c, and also to FIGS. 4a-6c, the splitting unit 500 comprises a splitting chute 510, a splitting wedge 600, a pressure plate 515 arranged to support and press the log 900 while splitting the log 900, and means for moving the pressure plate 515 and/or the splitting wedge 600 towards each other. The pressure plate 515 is arranged to support the log 900 in the direction of pressing, which normally is the longitudinal direction of the log 900. The splitting chute 510 opens to an opening direction. The splitting chute is 510 is configured to receive a log 900 at least from the opening direction. For example, in FIGS. 6a to 6c, the splitting chute 510 opens upwards. The log 900 is moved from the cutting unit 400 to the splitting chute 510 such that at least part of the log 900 is arranged in the splitting chute, in between the splitting wedge 600 and the pressure plate 515. For example, the log 900 may simply drop from the cutting unit 400 to the chute 510, or may move supported by a surface downwards and to the side. Thus, when a log 900 that is arranged on the bottom of the splitting chute 510 in between the pressure plate 515 and the splitting wedge 600, and the splitting wedge 600 and/or the pressure plate 515 is/are moved towards the other (or each other), at some point of time the log 900 is split by the splitting wedge 600. As detailed above, the log 900 is split into pieces (925, 920, 910). In an embodiment, the pieces comprise an intermediate split log 910, which may be automatically re-split, and at least one firewood-ready piece 920 being sufficiently small for use as firewood.

In an embodiment, the pressure plate 515 is a moving pressure plate, and the position of the splitting wedge 600 is fixed relative to the frame of the firewood processor while splitting. Alternatively, the splitting wedge 600 may be a moving splitting wedge 600 and the position of the pressure plate 515 is fixed relative to the frame of the firewood processor while splitting. Also both the pressure plate and the splitting wedge 600 could be moving during splitting. Preferably the pressure plate 515 is a moving pressure plate. Preferably the position of the splitting wedge 600 is fixed relative to the frame of the firewood processor while splitting.

Preferably, the firewood processor 300 comprises a press 520, such as a hydraulic press or a hydraulic piston. The press 520 comprises the pressure plate 515 (such as that surface of the press 520 that faces log 900) and a means for moving the pressure plate 515 towards the splitting wedge 600. In this embodiment, the position of the splitting wedge 600 relative to a frame of the firewood processor 300 (and thus to ground) is preferably fixed, at least temporarily during splitting. The press 520 is arranged to press the log 900 along the splitting chute 510 against the splitting wedge 600 to split the log 900. In an embodiment, the splitting wedge 600 is configured to split the log 900 into an intermediate split log 910 and at least one firewood-ready piece 920.

An embodiment of the firewood processor 300 comprises a returning element or plate 530 that is configured to return the intermediate split log 910 (or intermediate split logs) back to the splitting chute 510 for further splitting. The returning element 530 may be integrated with the press 520. For example, the press may be a hydraulic piston, which, when extending, is arranged to split the log 900 to at least the intermediate split log 910, and when retracting, is arranged to retract also the returning element 530 in such a way that the returning element 530 pulls the intermediate split log 910 back to the splitting chute 510. Thereafter, the intermediate split log 910 can be re-split into at least another firewood-ready piece 920 by using the press 520.

Preferably, the firewood processor 300 is configured to split the log 900 to only one intermediate split log 910 and at least two or three firewood-ready pieces 920, and the returning element 530 is configured to return said only one intermediate split log 910 at a time back to the splitting chute 510. This has two effects. Handling only one intermediate split log 910 is easier than to handle multiple such logs 910. Moreover, size requirements are more easily met, when sufficiently many firewood-ready pieces 920 are produced in one go, in particular, when the thickness of the wood 990 increases. Referring to FIGS. 6a-6c, in an embodiment, the splitting wedge 600 is arranged to split the log 900 to at least four or at least five, such as six firewood-ready pieces 920.

FIGS. 4a and 4b show, in a side view, splitting a log 900. FIGS. 5a and 5b show, in a perspective view, the splitting shown in FIGS. 4a and 4b. Moreover, FIG. 6a shows, in an end view, the splitting shown in FIGS. 4a and 4b. In FIG. 4a, a part of a log 900 is arranged in a splitting chute 510 of a firewood processor 300. The log 900 is arranged on the bottom of the splitting chute 510. The log 900 is left in between the splitting wedge 600 and a pressure plate 515 comprised by a hydraulic press 520. The relative placements of the log 900, the splitting chute 510 and the splitting wedge 600 are depicted in FIGS. 4a, 5a, and 6a.

When splitting, the moving pressure plate 515 presses the log 900 along the splitting chute 510 against the splitting wedge 600, thereby splitting the log 900 into the intermediate split log 910 and the firewood-ready pieces 920, as depicted in FIGS. 4b and 5b. The corresponding pieces are shown also in FIG. 6a. As the press 520 is retracted, the returning element 530 pulls the intermediate split log 910 back to the splitting chute 510. Thus, after returning, at least part of the intermediate split log 910 is arranged into the splitting chute 510 or the intermediate split log 910 is arranged on the bottom of the splitting chute 510, whereby the intermediate split log 910 can be re-split by re-engaging the press 520.

Figure 2A:
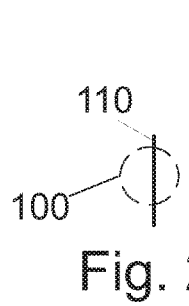
FIGS. 2a-2c show known splitting wedges.
Figure 2B:
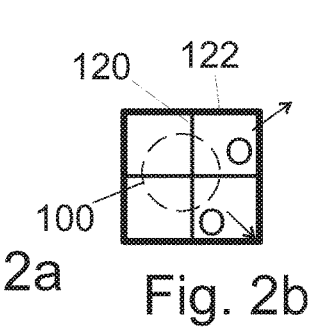
Figure 2C:
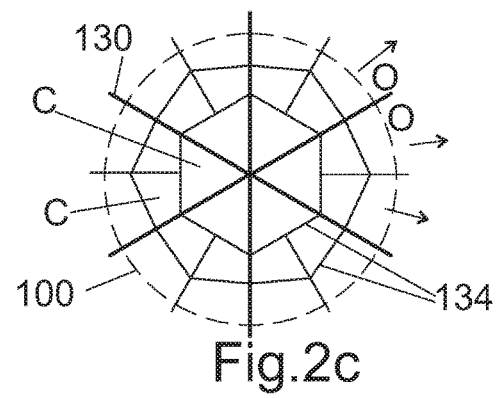

FIG. 6b illustrates how the intermediate split log 910 can be re-split in a similar manner to further firewood ready parts 920 and a further intermediate split log 910. Thereafter, the remaining intermediate split log 910, as depicted in FIG. 6c, is so small, that it can be split only to further firewood-ready pieces 920. In this way, the (thick) log 900 can be split to firewood ready pieces 920 with reasonably small forces. The force requirements are reduced in particular, when the splitting wedge 600 is free from the closed central parts "C" (see FIG. 2c). Small forces are also obtainable faster than large forces, provided that the operative power of the firewood processor is not changed. In this way, firewood can also be made faster.

In order to keep the forces required for splitting reasonable small, the splitting wedge 600 preferably does not comprise closed areas in the aforementioned meaning. Thus, in an embodiment, the wedge 600 is arranged to split the log 900 is such a way that none of the firewood-ready pieces 920 is left in between the center of another firewood-ready piece 920 produced by the same splitting and the center of the intermediate split log 910. In other words, during splitting, each of the firewood-ready pieces 920 is arranged to neighbor an intermediate split log 910, provided that at least one intermediate split log 910 is produced (cf. FIGS. 6a-6c).

Referring to FIGS. 6a-6c, the firewood wedge 600 comprises a main wedge 602 that is configured to split the intermediate split log 910 from the log 900. Thus, the main wedge 602 comprises a first side and a second side. The sides of the main wedge 602 are named such that the intermediate split log(s) 910 passes/pass the main wedge 602 on the first side of the main wedge 602.

Referring to FIGS. 4a-6c, in an embodiment, the splitting wedge 600 comprises a plate 610 having a concave upper side 615 and a convex lower side 617, whereby the concave side 615 forms a channel 620 for receiving the intermediate split log 910. The plate may extend from the main wedge 602. In the alternative, the splitting wedge 600 may be separate from the plate 610. In such a case the plate 610 extends on the other side of the splitting wedge 600 than the splitting chute 510. The plate 610 may extend from the splitting wedge 600 or the plate 610 may extend from a point being close to the splitting wedge, the point being less than 5 cm or less than 2 cm away from the splitting wedge 600. These sides 615, 617 of the plate 610 could alternatively be a planar upper side 615 and a planar lower side 617. This channel 620 opens upwards. The shape of the plate 610 may be adapted to the shape of the main wedge 602. In an embodiment, an end view of the main wedge 602, as seen from the longitudinal direction of the splitting chute 510, is substantially similar to the same end view of the plate 610.

The splitting wedge 600 comprises at least one, preferably at least two, firewood wedges 605 protruding from the convex side 617 of the plate 610 (or the convex side of the main wedge 602) and arranged at an angle with respect to the tangent plane of the plate 610 or the main wedge 602. The tangent plane here refers to the tangent plane of the plate 610 or the main wedge 602 at the point from which the splitting wedge protrudes. The angle may be e.g. at least 60 degrees, such as at least 85 degrees. As depicted in FIG. 6a, during splitting the log 900, the intermediate split log 910 is arranged to be left on the concave side 615 of the plate 610. Moreover, on the convex side 617 of the plate 610, the firewood wedge or firewood wedges 605 are arranged to split the other part of the log 900 (i.e. the part that remains of the log 900 when the intermediate split log 910 is split away) into the firewood-ready pieces 920. Thus, the firewood-ready pieces 920 are arranged to be left on the convex side of the plate 610. Thus, the firewood-ready pieces 920 may be collected from the convex side of the plate 610. The firewood-ready pieces 920 can be left e.g. below the plate 610, as indicated in FIGS. 4a-5b. A means for transferring the firewood-ready pieces 920 away from the splitting unit 500 may be arranged below the plate 610 and to receive said firewood-ready pieces 920. As an example, and as shown in the figures, a vibrator screen 710 may be arranged below the plate 610 and to receive said firewood-ready pieces 920.

The length Lp of the plate 610 (see FIG. 3d) is selected to be sufficient for receiving the intermediate split log 910. The length Lp may be e.g. at least 35 cm, 50 cm, at least 75 cm or at least 100 cm. The width Wp of the splitting wedge 600 (see FIG. 6a) can be selected to be sufficient in relation to the thickness of the wood 990. When the saw 410 is configured to saw only wood 990 having thickness less than a maximum thickness and/or a gate or an opening is configured to pass only wood 990 having thickness less than a maximum thickness to the saw 410, as discussed above, the width Wp of the splitting wedge 600 (see FIG. 6a) can be selected to be at least the maximum thickness. In addition or alternatively, the width Wp of the splitting wedge 600 may be e.g. from 400 mm to 900 mm, such as from 400 mm to 650 mm. In an embodiment, a part of the upper surface (e.g. first side 615) of the plate 610 forms an angle α with another part of the upper surface (e.g. first side 615) plate 610, wherein the angle α is from 60 degrees to 180 degrees, as shown in FIG. 6c. Preferably the angle α is from 90 degrees to 160 degrees. This angle has been observed to provide a sufficiently steep channel 620 for receiving the intermediate split log to a well-controlled position and to provide sufficiently small firewood for typical thicknesses of a log 900. This angle may be substantially equal to an angle of the bottom of the splitting chute 510. In an embodiment, a part of the main wedge 602 forms an angle $\alpha_2$ with another part of the main wedge 602, wherein the angle $\alpha_2$ is from 60 degrees to 180 degrees (FIG. 6c). Preferably the angle $\alpha_2$ is from 90 degrees to 160 degrees. This angle has been observed to provide good splitting into at least one intermediate split log 910. The angle $\alpha_2$ may be equal or substantially equal to the angle α (FIG. 6c).

Whether the splitting wedge 600 forms closed parts (see reference "C" in FIG. 2b) depends also on the mutual position of the splitting wedge 600 and the splitting chute 510. For example, if the wedge 600 of FIGS. 6a-6c would be arranged somewhat higher, the wedge support 612 would close the openings of the splitting wedge 600. Moreover, if the splitting wedge 600 would be arranged in the splitting chute 510, i.e. in between the ends of the splitting chute, and the chute would not widen, the splitting chute 510 itself would prevent the firewood-ready pieces 920 from expanding or bending downwards. Either of these effects would increase the forces needed for splitting. Thus, preferably, the splitting wedge 600 is arranged close to an end of the splitting chute 510.

If not even a part of the splitting wedge 600 is arranged in between the two ends of the splitting chute 510, a gap may remain in between an end of the splitting chute 510 and the splitting wedge 600 in the longitudinal direction of the splitting chute 510. The gap should be reasonable narrow in order to avoid a log from falling or turning in said gap. In such a case, the gap is preferably at most 5 cm wide or at most 2 cm wide. The gap may also be zero or essentially zero, whereby the splitting wedge 600 extends continuously from an end of the splitting chute 510 and away from the splitting chute 510. A small gap accumulates less bark and other debris than a larger gap.

If a part of the splitting wedge is arranged in between the two ends (i.e. a first end and a second end) of the splitting chute 510, and the splitting chute does not widen towards the first end, the distance from the splitting wedge 600 to the first end of the chute 510 is preferably small, such as at most 10 cm. This has the technical effect that the firewood-ready pieces 920 can turn during the splitting without the splitting chute being pressed against the pieces 920. Thus, smaller forces are needed for splitting.

Referring to FIG. 6a, preferably the splitting wedge 600 extends from an end of the splitting chute 510 and away from the splitting chute 510 (continuously or after a reasonable small gap as depicted in FIGS. 4a and 4b) and at least some of the firewood wedges 605 are arranged to extend also below the bottom of the splitting chute 510 as depicted in FIGS. 6a-6c. Referring to FIG. 6a, more preferably all the firewood wedges 605 are arranged extend also below the bottom of the splitting chute 510. This has the technical effect that the firewood-ready pieces 920 can expand or bend downwards after being split from the log 900. More precisely, referring to FIG. 6b, this has the effect that when splitting an intermediate split log 910, the firewood-ready pieces 920 can expand or bend downwards. This happens even if the shape bottom side of the intermediate split log 910 is fitted the shape of the splitting chute 510. This can happen irrespective of whether the splitting wedge comprises a wedge support 612 or not. The wedge support 612 can be used to support the firewood wedges 605 in such a way that the firewood wedges 605 are fixed from one end to the main wedge 602 or the plate 610, and from the other end to the wedge support 612. Alternatively, the wedge support 612 could be arranged at an angle in such a way that the openings of the splitting wedge 600 would widen in the direction to which the log is pressed while splitting.

As implicit from the figures, the firewood wedges 605 are not necessarily directly below the bottom of the splitting chute 510. By the meaning of the term chute, the splitting chute 510 extends in a longitudinal direction. The plane of FIG. 6a is a plane having a surface normal parallel to the longitudinal direction of the splitting chute 510. Moreover, FIG. 6a shows the normal projections of all the firewood wedges 605 of the splitting wedge 600, as well as the normal projection of the splitting chute 510. The normal projections are projected (i) onto the plane having a surface normal parallel to the longitudinal direction of the splitting chute 510 and (ii) in the longitudinal direction of the splitting chute 510. As depicted in the FIG. 6a, the normal projections of all the firewood wedges 605 of the splitting wedge 600 intersect the normal projection of the splitting chute 510. This has the effect that the wedge support 612 is left below the bottom of the splitting chute 510, whereby the split firewood-ready pieces 920 can expand downwards. This happens at least, when not even a part of the splitting wedge is arranged in between the ends of the splitting chute 510.

The vertical location of the splitting wedge 600 can be arranged fixed relative to the splitting chute 510 (notwithstanding detaching the splitting wedge for maintenance). In the alternative, the vertical location of the splitting wedge 600 can be arranged variable relative to the splitting chute 510. If the vertical location is variable, the user can lower the splitting wedge to produce smaller firewood, and raise it to produce larger firewood. Naturally, the location of the splitting wedge 600 can be temporarily fixed during splitting. However, if all the firewood wedges 605 can be raised above the bottom of the splitting chute 510, a log 900 may easily be jammed, as in that case, the firewood-ready pieces 920 cannot freely expand or bend as discussed above. Thus, in the fixed position or in all the positions to which the splitting wedge can be moved and temporarily fixed, the normal projection of at least one firewood wedge 605 of the splitting wedge 600 intersects the normal projection of the splitting chute 510. Herein the normal projections are defined as above, and shown in FIGS. 6a-6c. Preferably, in the fixed position or in all the positions to which the splitting wedge can be moved and temporarily fixed, the normal projection of all the firewood wedges 605 of the splitting wedge 600 intersect the normal projection of the splitting chute 510.

FIGS. 10a and 10b show the splitting wedge 600 arranged at two different vertical locations with respect to the splitting chute 510. Moreover, a profile of the splitting chute 510 having only partially concave form is shown therein. As depicted, the projection of at least one firewood wedge 605 intersects the projection of the splitting chute 510 in both the positions. Preferably, the projection(s) of at least one, preferably all, firewood wedges 605 extend(s) at least a distance d below the projection of the splitting chute 510 in the aforementioned plane (See FIG. 10b). All the firewood wedges need not to extend the same distance. Herein the term "below" is to be understood as a direction that forms an angle of more than 90 degrees relative to the direction to which the splitting chute 510 opens. Preferably the position of the splitting wedge is, or the splitting wedge can be moved, such that the distance d is 15 mm, 25 mm, or 30 mm. The distance can be measured along the firewood wedge 605, from the intersection of the projections of the firewood wedge 605 and the splitting chute 510, and in a direction that forms an angle of more than 90 degrees relative to the direction to which the splitting chute 510 opens. In an embodiment, the projections of all the firewood wedges 605 extend below the projection of the splitting chute 510 in the aforementioned plane such that the firewood wedges 605 in the central part of the splitting wedge extend a shorter distance below the splitting wedge than the firewood wedges 605 in the boundary area the splitting wedge. Depending on the location, the projection of a firewood wedge can extend from 30 mm to 190 mm from the intersection downwards (i.e. below the projection of the splitting chute). In this embodiment, the projections of all firewood wedges 605 extend at a distance d below the projection of the splitting chute 510, wherein d is 30 mm (alternatively d could be 15 mm or 25 mm).

In addition, in an embodiment, wherein the position of the splitting wedge is movable, the firewood processor is arranged to check whether the splitting wedge 600 is arranged at a proper height with respect to the splitting chute in the aforementioned sense. The firewood processor 300 is arranged to split the log only when the splitting wedge 600 is at a proper height; or to engage the means for splitting the log only in a position where the splitting wedge not arranged to split a log, or completely detached from the firewood processor 300. This helps to prevent logs from being jammed in the splitting wedge 600.

In a preferred embodiment, the splitting wedge 600 is fixable to only one such location in the firewood processor 300 where the splitting wedge 600 is configured to split a log 900. Naturally another wedge, such as a spare wedge, can be temporarily fixed to a second location, in which the spare wedge is not arranged to split a log. Moreover, the one location is arranged at a proper height in the above sense. Also in this way, the firewood processor 300 is arranged to engage the means for moving the pressure plate 515 and/or the splitting wedge 600 towards each other only when the splitting wedge 600 is at a proper height or completely detached from the firewood processor 300. Naturally, the splitting wedge 600 is detachable for maintenance purposes. Thus, the splitting wedge 600 is at least temporarily fixable to said location. The structure of the firewood processor 300 simplifies, when the wedge 600 is not arranged movable in the vertical direction, i.e. the wedge 600 is fixable only to one location in the firewood processor 300 in the aforementioned sense. Moreover, different splitting wedges 600 can be configured to split a log 900 to firewood of different size.

For example, a first splitting wedge may be arranged to produce firewood having a maximum diameter of 15 cm. For example, a second splitting wedge may be arranged to produce firewood having a maximum diameter of 20 cm. For example, a third splitting wedge may be arranged to produce firewood having a maximum diameter of 25 cm. In practice, it is an easier and cheaper solution to have separate changeable splitting wedges 600 for different purposes than to use the same vertically movable splitting wedge 600 to produce firewood of different size.

As indicated in FIGS. 6a-6c, in an embodiment, the shape of the cross section of the bottom of the channel 620 for receiving the intermediate split log 910 may be adapted to the shape of the cross section of the bottom of the splitting chute 510. This has the effect that the intermediate split log 910 fits to the shape of the splitting chute 510.

In an embodiment, the returning element 530 is configured to return, in addition to the intermediate split log 910, large impurities, such as bark, from the channel 620 for receiving the intermediate split log back to the splitting chute 510. Therefore, the shape the cross section of the returning element 530 is adapted to the shape of the cross section of the channel 620 for receiving the intermediate split log 910.

Moreover, to further help removing impurities from the channel 620, the returning element 530 may comprise resilient material 532 arranged at least on the boundary of the returning element 530. The resilient material 532 may comprise e.g. plastic or rubber, or it may be a thin metal blade. The resilient material 532 may be arranged to be changeable. E.g. the resilient material may be attached to the returning element with openable locking means, such as a screw, a clip, or a shape-locking means. In this way, the returning element 530 is arranged to return also smaller objects. Moreover, as the resilient material may wear, it preferably is changeable.

For safety reasons, an unprotected firewood processor cannot be used or can be automated to only some degree. Therefore, an embodiment of a firewood processor 300 comprises at least one a protector 310, 420 configured to be in an open position and a closed position. In the closed position, the protector 310 is arranged to prevent the user of the firewood processor 300 from pushing his hands or other body parts into the interior of the splitting part 500 of the firewood processor 300. The interior is limited by the protector 310. To facilitate handling of the log 900 and/or the intermediate split log 910, in the open position, the protector 310 is arranged to allow the user of the firewood processor to handle the log 900 or the intermediate split log 910 arranged in the splitting unit 500. In the closed position, the protector 420 is arranged to prevent the user of the firewood processor 300 from pushing his hands or other body parts into the interior of the cutting part 400 of the firewood processor 300. The interior is limited by the protector 420. In the open position, the protector 420 is arranged to allow the user of the firewood processor to handle wood 990 or the log 900 arranged in the cutting unit 400.

For safety reasons, an embodiment comprises a protector position sensor 315 configured to detect the position of at least one of the protectors 310, 420. Moreover, the firewood processor 300 is arranged to engage at least one such a tool of which operation is dangerous to a user only when at least one or two the protectors 310, 420 is in the closed position. Such tools may include at least one of (i) the means 520 for moving the pressure plate 515 and/or the splitting wedge 600 towards each other, (ii) the returning element 530 arranged to automatically return the intermediate split log 910 to the splitting chute 510, (iii) the saw 410, and (iv) the means 330 for feeding wood 990 for the saw 410. However, some of these tools may also be configured in such a way that their operation is not a safety risk for the user. In an embodiment, the firewood processor 300 is arranged to engage the press 520 and split the log 900 (or the intermediate split log 910) only when the protector 310 is in the closed position. In an embodiment, the firewood processor 300 is arranged to automatically return the intermediate split log 910 using the returning element 530 to the splitting chute 510 only when the protector 310 that protects the user from the returning element 530 is in the closed position. In an embodiment, the firewood processor 300 is arranged to engage the saw 410 only when the protector 420 is in the closed position.

Figure 3A:
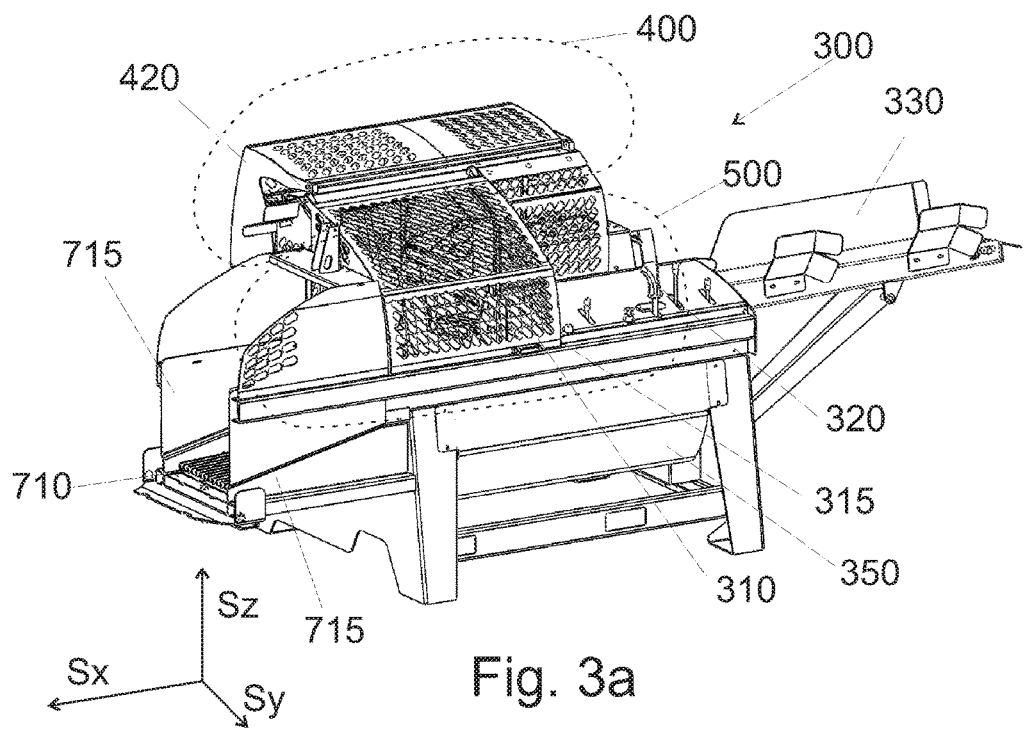

Still further, the firewood processor may comprise at least one controller 320. The operator may use the controller 320 to operate the firewood processor 300. In an embodiment, the firewood processor 300 is configured, in response to a control signal from the controller 320, to engage the press 520 and split the log 900 or the intermediate split log 910. For example, the controller 320 may be a joystick-type controller comprising various buttons, as depicted in FIGS. 3a and 3e. For example, the press 520 may be engaged by pressing the button 322. A control unit 350 may be arranged to receive a signal from the protector position sensor 315 and another signal from the controller 320, and configured to engage the press 520 in response to a signal from the controller only when the signal from the protector position sensor 315 indicates that the protector 310 is in the closed position. A control unit 350 may be arranged to receive a signal from another protector position sensor 415 and another signal from the controller 320, and configured to engage the saw 410 in response to a signal from the controller only when the signal from the other protector position sensor 415 indicates that the protector 420 is in the closed position.

Moreover, the firewood processor 300 may be automated in such a way that the firewood processor 300 is, after splitting the log 900 and without user-given control signals from the controller 320 or another controller (or in the case the press has been engaged with a controller, without further user-given control signals from the controller 320 or another controller), configured to automatically return the intermediate split log 910, using the returning element 530, to the splitting chute 510 for further splitting. The user-given control signal refers to signal made by the user. The firewood processor 300 may be configured the detect the instance when the log has been split, e.g. when the press 520 has extended all its working length, and automatically return the returning element 530 thereafter. Thereafter, the press 520 may be re-engaged automatically or using the controller 320. This improves to comfort of use, as the user needs not to indicate to the firewood processor 300 that the press 520 must be returned. This may also be conditional such that the means for moving the pressure plate 515 and/or the splitting wedge 600 towards each other is arranged to move only when the protector 310 (and optionally also the protector 420) is in the closed position.

To further increase the comfort of use, in an embodiment, the controller 320 is arranged to be used by an operator of the firewood processor 300 with only one hand. Thus, in addition, the firewood processor 300 is configured, in response to a control signal only from the controller 320, to engage the means for moving the pressure plate and/or the splitting wedge towards each other (e.g. the press 520). Thus, the other hand of the user can be set free during operation. The one-hand operation can be achieved e.g. by the controller 320 shown in FIGS. 3a and 3e.

To further increase the comfort of use, the firewood processor 300 may be arranged to automatically split the log 900 and the intermediate split log 910 as many times as needed without further control signals from the user. For this purpose, an embodiment of a firewood processor 300 comprises a control unit 350 configured to control at least the means for moving the pressure plate 515 and/or the splitting wedge 600 towards each other (e.g. the press 520). In a corresponding embodiment, the firewood processor 300 comprises a sensor 340 for detecting the presence of the intermediate split log 910 in the splitting unit 500, such as on the plate 610 (see FIGS. 6a-6c). The sensor 340 is configured to provide the control unit 350 with a signal indicative of the presence of the intermediate split log 910 in the splitting unit 500. The sensor may be configured to send a signal indicative of the presence of the intermediate split log 910 in the splitting unit 500 to the control unit 350. The control unit 350 is arranged to receive the signal, determine the presence of the intermediate split log 910 in the splitting unit 500, and automatically re-engage the press 520. In this way, the firewood processor 300 is configured to automatically further split the intermediate split log 910.

An ultrasound sensor 340 has been found to work well for the purpose. However, in addition or alternatively, another sensor 340 or other sensors 340, such as an optical sensor, a weight sensor, or a pressure sensor, can be used.

The automatic function may be turned on e.g. using a switch 324 (see FIG. 3e). The switch 324 may be e.g. a button, by which the automatic splitting may be turned on, and the automatic splitting is automatically turned off after the log 900 has been completely split. Alternatively, the switch 324 may be e.g. a button, by which the automatic splitting may be toggled on and off. Alternatively, the switch 324 may be e.g. a rocker switch, by which the automatic splitting may be set on or off. The firewood processor 300 may be configured accordingly.

The controller 320 may comprise a button 328 for engaging the saw 410. The controller 320 may comprise a button 326 for engaging a means (1445a, 445b) for moving a log from the cutting unit 400 to the splitting unit 500. Moreover, turning the stick 320 to left may e.g. feed wood to the saw 410. Moreover, turning the stick 320 to towards the user may e.g. lower the saw 410, whereby wood 990 may be cut.

As an alternative to the semi-automated use, the firewood processor 300 may be fully automated. The firewood processor may be arranged to detect its state, and automatically perform the actions required in that state. For example, if the splitting chute 510 is empty, and the press 520 has been returned to its initial position, a log 900b may be fed to the splitting chute 510; naturally the log 900b needs to have been cut from wood 990. When the log has been moved, it can be automatically split and re-split as many times as needed. Moreover, when the log has been moved to the splitting chute, wood 990 may be fed to the saw 410 and a next log can be cut from the wood 990.

Referring to FIGS. 7a and 7b, in a preferred embodiment, the firewood processor 300 comprises a support 430, e.g. in the cutting unit 400, for supporting the cut log 900b. This has the effect that the lob 900b does not tear off from the wood, and the sawn surface of the log 900b remains straight. This ensures high quality of the firewood, as the end surface of the firewood is a factor affecting quality. Moreover, to enable simultaneous splitting of a first log 900a (or a corresponding intermediate split log), and cutting of a second log 900b, the firewood processor 300 may comprise means 440 for preventing the movement of the cut log 900b into the splitting chute 510 at a first time (see FIGS. 7a and 7b). This can be achieved by shaping the support 430 in a corresponding manner, as in FIG. 7b, or e.g. a protrusion 440 (FIG. 7a) can be used for the purpose. Still further, when a previous log 900a has been fully split, the subsequent log 900b should be moved to the splitting chute 510. Thus, the firewood processor comprises means (445a, 445b) for transferring the subsequent cut log 900b to the splitting chute 510 or means (445a, 445b) for allowing the cut log to move to the splitting chute 510 at a second time, wherein the second time is different from the first time. For example, in FIG. 7a, the protrusion 440 can be retracted into the support 430. When retracted, the log 900b can move over the retracted protrusion 445a to the splitting chute. In FIG. 7b, an actuator 445b, such as a pusher 445b, is used for transferring the cut log into the splitting chute. In addition, the support 430 can be arranged at a higher position than the bottom of the splitting chute 510, whereby gravity can be utilized for transferring the log 900b. In FIGS. 7a and 7b, the cutting unit 400 and the splitting unit 500 are separated by a dotted line.

Preferably, the log 900b is arranged to move or be moved from the support 430 to the splitting chute 510 in at least a direction that forms an angle of at most 60 degrees with a horizontal direction. This reduces the height of the firewood processor, and therefore also improves the stability. In this way, the risk of the whole firewood processor being fallen is reduced. Preferably, this angle is at most 45 degree or at most 30 degrees. Such a small angle even further decreases the risk a falling.

Preferably, at least part of the support 430 is substantially horizontal (e.g. forms an angle of at most 10 degrees with the horizontal plane), and the firewood processor comprises an actuator 445b configured to move a log 900b along the support 430 towards the splitting chute 510. In this way, the support 430 can be configured to support the part of the wood 990 that form the log 900b after cutting at the same location wherein the cut log 900b remains after cutting. This helps to prevent the tearing of the log 900b while cutting.

Irrespective of how the log is split into pieces 925, these pieces 925 of the log 900 are normally intermixed with impurities, such as bark, debris, and/or sawdust. According to the aforementioned firewood quality standard, high quality firewood should be free from such impurities or at least substantially free from such impurities. It has been observed that impurities can be effectively removed using a vibrator screen 710. Moreover, such a vibrator screen 710 can be integrated with any firewood processor 300, for example with an embodiment described above or with a conventional firewood processor.

Such a firewood processor 300 comprises a cutting unit 400 as described above, a splitting unit 500 (a traditional splitting unit arranged to split the log in only one go or a splitting unit as discussed above), and means for moving a log 900 from the cutting unit 400 to the splitting chute 510. The means for moving the log 900 from the cutting unit 400 to the splitting chute 510 may be e.g. a tilted plane, along which the log may slide. Alternatively, the log may simply drop to the splitting chute after having been cut. Referring to FIGS. 3a-3b and 9a-9c, the firewood processor further comprises a vibrator screen 710 configured to separate impurities, such as bark, sawdust, and/or debris, from the pieces 925 of a log 900 to obtain clean firewood 930 and means 705 for vibrating the vibrator screen 710. Preferably, the vibrator screen 710 is arranged to such a location that the vibrator screen 710 is configured to receive the pieces 925 of log (e.g. firewood-ready pieces 920) from the splitting unit 500. An example of such an arrangement is shown in FIGS. 3a, 3b, and 4a-5b. Preferably, the vibrator screen 710 is arranged to such a location that the pieces 925 of log are arranged to move from the splitting unit 500 to the vibrator screen 710 only by at least one of (i) the movement of the log 900 during the splitting and (ii) gravity. Preferably, the vibrator screen 710 is arranged to a lower position (i.e. closer to ground level) than the splitting chute 510.

Herein the term piece 925 of log 900 refers only to a part of a log resulting from splitting. Thus, the firewood-ready pieces 920, as discussed above, are examples of pieces 925 of log. However, it is also possible to traditionally split a log into at least two pieces, which are conveyed to the vibrator screen 710. At some point, too large pieces 925 of log can be manually detected and moved back for re-splitting, as indicated in FIGS. 8c and 8d. Eventually, only firewood-ready pieces 920 will be produced, which have also been cleaned by the vibrator screen 710.

In a preferred embodiment, the vibrator screen 710 is arranged to such a location that the vibrator screen 710 is configured to receive only firewood-ready pieces 920. The vibrator screen 710 may be configured to receive only firewood-ready pieces 920 from the splitting unit 500. The vibrator screen 710 may be configured to receive only firewood-ready pieces 920 that are arranged to move from the splitting unit 500 to the vibrator screen 710 only by at least one of (i) the movement of the log 900 during the splitting and (ii) gravity.

Preferably, the firewood processor 300 comprises walls 715 (see FIGS. 3a and 3d), in between which the vibrator screen 710 is arranged. Thus, the walls 715 and the vibrator screen 710, in combination, form a chute wherein the processed firewood (920, 925, 930) is arranged to move. The bottom of the chute may comprise the vibrator screen, or the walls may define a narrower chute, whereby bottom of the chute may comprise a part of the screening part of the vibrator screen. This helps the collection of clean firewood 930 only from an end of the vibrator screen. The wall 715, in turn, limits the movement of process firewood (920, 925, 930) in such a way that the processed firewood does not fall off the vibrator screen 710 in the transversal direction. Naturally, the collection of firewood 930 is easy also when the vibrator screen is replaced with any means for transferring firewood, in such a way that the walls 715 and the means for transferring firewood form the aforementioned chute. Examples of such means include a plate, a roll conveyor, and the vibrator screen 710. As will become evident, the movement of firewood on such means can be facilitated by the movement of subsequent pieces of firewood coming from the splitting unit 500.

Preferably, the length Lv of the vibrator screen 710, in the direction wherein the processed wood is arranged to move (see FIG. 9a), is at least 300 mm or at least 500 mm. These lower limits have been found to be sufficient for producing sufficiently clean firewood 930. In addition or alternatively, the length Lv of the vibrator screen 710 may be at most 2 m or at most 1.5 m. The upper limit helps integrating the vibrator screen 710 with a firewood processor 300.

Various splitting processes are described in FIGS. 8a-8d. Cutting wood 990 to a log 900 is depicted in FIG. 8a only; however it is understood that a firewood processor 300 is arranged also to cut wood 990.

FIG. 8a shows an embodiment, wherein a log 900 is automatically split three times, as in FIGS. 6a-6c. In FIG. 8a, the firewood-ready pieces 920 are not cleaned. In FIG. 8b, these firewood-ready pieces 920 are cleaned using a vibrator screen 710 to produce clean firewood 930. FIGS. 8c and 8d illustrate the possibility of using a vibrator screen 710 for cleaning pieces 925 of log even in a case, where an operator manually checks whether the pieces 925 comply with size requirements. Too large pieces are manually transferred for re-splitting. The size of the pieces 925 can be checked after cleaning (FIG. 8c), before cleaning (FIG. 8d), or during cleaning (not shown), e.g. by visual observation.

An embodiment of FIG. 8b, wherein such a splitting wedge 600 is used that during splitting none of the firewood-ready pieces 920 is left in between the center of another firewood-ready piece 920 produced by the same splitting and the center of the intermediate split log 910 (see e.g. FIG. 5b), has been found particularly effective. In this case, the splitting wedge 600 is configured to produce, in addition to the intermediate split log 910, only one layer of firewood-ready pieces 920. All of these firewood-ready pieces 920 may neighbor the intermediate split log 910, provided that the intermediate split log 910 is large enough (see FIGS. 6a and 6b). It has been observed that the vibrator screen 710 cleans firewood-ready pieces 920 effectively, when the firewood-ready pieces 920 are arranged substantially in only one layer on the vibrator screen 710. Conversely, when pieces 925 of the log, such as firewood-ready pieces 920, are arranged on top of each other, cleaning is less effective. This could happen e.g. when a splitting wedge of FIG. 2b of 2c would be used, and all the resulting pieces 925 would be conveyed onto a vibrator screen 710. Evidently, the wedges of FIGS. 2b and 2c produce at least two layers of firewood or firewood-ready pieces, at least if reasonably thick wood is split. In an embodiment, the firewood processor is arranged to produce only one layer of non-overlapping pieces of log (920, 925) and the vibrator screen 710 is arranged to receive these pieces of log (920, 925) such that the pieces (920, 925) are arranged in only one layer also on the vibrator screen 710. Moreover, in such an embodiment, the firewood can be easily transferred in a channel limited by the walls 715.

FIGS. 9a-9c show a vibrator screen 710 in a perspective view, side view, and top view, respectively. Referring to FIG. 9c in particular, the vibrator screen 710 limits openings 720, through which the impurities are arranged to run, the openings 720 having a length Lo and a width Do, wherein the length Lo is greater than or equal to the width Do. In this application some impurities, such as sawdust is relatively small, whereby narrow openings allow for some impurities to be removed. In an embodiment, the width Do of at least one opening is greater than 1 mm.

In this application some impurities, such as bark is relatively large, whereby sufficiently wide openings are beneficial. In an embodiment, the width Do of at least one opening is greater than 1 cm, such as greater than 2 cm.

Moreover, as the vibrator screen 710 is used to separate firewood from impurities, and a splitting wedge 600 is used to separate pieces 925 from a log, sufficiently narrow openings 720 are beneficial. In an embodiment the splitting wedge 600 is arranged to split a log 900 into at least one firewood-ready piece 920 having a width D (see FIG. 1) of at most a maximum width and the width Do of at least one opening of the vibrator screen 710 is less than 70% of the maximum width. In an embodiment the splitting wedge 600 is arranged to split a log 900 into at least one firewood-ready piece 920 having a width D (see FIG. 1) of at most a maximum width and the width Do of each of the openings of the vibrator screen 710 is less than 70% of the maximum width. In an embodiment, the width Do of each opening 720 of the vibrator screen 710 is less than 10 cm.

In an embodiment, the splitting wedge 600 has such a shape that the maximum width of the firewood-ready pieces 920 is 15 cm, the vibrator screen 710 is arranged to receive only the firewood ready pieces 920, and the width Do of each opening 720 of the vibrator screen 710 is less than 10 cm.

In an embodiment, the splitting wedge 600 is arranged to split a log into at least two pieces 925 of log and the width of each opening of the vibrator screen 710 is less than 10 cm. This may be irrespective of whether the width of the pieces 925 is less than 15 cm or not.

Referring to FIGS. 9a and 9c, an embodiment of the vibrator screen 710 comprises longitudinal elements 730, such as rods or bars. The longitudinal elements are preferably substantially parallel. The angle between any two neighboring longitudinal elements 730 may be small, e.g. at most 5 degrees. Two neighboring longitudinal elements 730 are arranged a distance away from each other, whereby an opening 720 is left in between the two elements. This has the technical effect, that pieces 925 of log can move easily on the vibrator screen in the direction of the rods. The distance between two neighboring longitudinal elements may be selected to be within the limits discussed for the width of the openings. Provided that the longitudinal elements are parallel, the distance between two neighboring elements is constant, and it may be e.g. from 1 mm to 10 cm; such as from 1 cm to 10 cm. Provided that the longitudinal elements are not parallel, the distance between the two neighboring longitudinal elements can be measured in a direction perpendicular to a longitudinal direction of one of the two neighboring longitudinal elements.

Moreover, the longitudinal elements 730 may be connected to each other with transversal elements 740. Referring to FIGS. 9a and 9b, preferably, at least such transversal elements 740, over which processed wood (920, 925, 930) is arranged to run, are arranged below the longitudinal elements 730. In this way, the processed wood (920, 925, 930) can move along the top surfaces of the longitudinal elements 730 without being arrested by the transversal elements. Naturally, transversal supports may be arranged to any height to such locations where processed wood is not arranged to run, e.g. near an end of the vibrator screen 710, if processed wood is received in between the ends of the vibrator screen 710. In an embodiment, the top surface of a transversal element 740 connecting two longitudinal elements 730 is arranged below the top surfaces of both the two longitudinal elements 730. Preferably, the top surface of a transversal element 740 connecting two longitudinal elements 730 is arranged at least 1 cm below at least one of the top surfaces of the two longitudinal elements 730. In an embodiment, the top surface of all such transversal elements 740 connecting two longitudinal elements 730, over which processed wood is arranged to run, are arranged below the top surfaces of both the two longitudinal elements 730. They may be arranged e.g. at least 1 cm below, as discussed above. The term "below" requires that the vibrator screen in not vertical. Herein it is understood that the vibrator screen 710 is not vertical if it forms an angle of at most 45 degrees with a horizontal plane or is exactly parallel to a horizontal plane.

The vibrator screen 710 may be substantially horizontal, or it may be arranged at an angle with respect to a horizontal plane. Arranging the screen at an angle may help to move the pieces (920, 925) on the vibrator screen 710 to a defined direction. However, the angle should be reasonably small, e.g. at most 15 degrees, in order to keep the processed firewood on the vibrator screen sufficiently long. Moreover, positioning the screen horizontally diminishes the height requirements and may improve the stability of the firewood processor. Typically, the vibrator screen 710 is configured to separate impurities from the pieces 925 of the log (or logs) to obtain clean firewood in such a way that during cleaning the impurities are configured to drop through at least an opening 720 of the vibrator screen 710 downwards and clean firewood 930 is arranged to stay on the vibrator screen 710. In an embodiment, the vibrator screen 710 is arranged to such a position that the processed firewood (920, 925, 930) on the vibrator screen 710 is arranged to be moved by the movement of the log 900 during the splitting. Thus, the log 900 or pieces 925 thereof is/are arranged to push the material on the vibrator screen 710 during splitting. In addition, gravity may be used to move the processed firewood (920, 925, 930).

Referring to FIG. 3d, provided that both the splitting chute 510 and the vibrator screen 710 are horizontal, the direction Sx2, wherein the longitudinal elements 730 of the vibrator screen extend the most is preferably parallel to a direction Sx1, in which direction Sx1 the splitting chute 510 extends in its longitudinal direction. As evident, the direction Sx1 is also the direction, wherein the log 900a is arranged to be moved during splitting. In this embodiment, the movement of the processed firewood (920, 925, 930) on the vibrator screen 710 is effectively facilitated with the movement of the log 900a during splitting.

However, at least one of the vibrator screen 710 and the splitting chute 510 may be arranged at an angle with respect to a horizontal plane. In such a case, and also in the case, wherein at least one of the vibrator screen 710 and the splitting chute 510 are horizontal, the projection of the first longitudinal direction Sx1 on a horizontal plane runs in a first horizontal direction and the projection of the second longitudinal direction Sx2 on a horizontal plane runs in a second horizontal direction. For the aforementioned easy movements, (i) the first horizontal direction is parallel to the second horizontal direction or (ii) the angle between the first horizontal direction and the second horizontal direction is at most 30 degrees, such as at most 15 degrees.

Because of such an arrangement, the vibrator screen 710 (or a corresponding means for transferring firewood, as discussed above) can operate even without a mechanized conveyor. This helps to keep the costs of the firewood processor 300 low. In an embodiment, the processed firewood (920, 925, 930) on the means for transferring firewood, such as the vibrator screen 710, is arranged to be moved only by at least one of (i) the movement of the log 900 during the splitting, (ii) gravity, and (iii) vibration of the vibration screen 710. Thus, no other means is needed for moving the processed wood (920, 925, 930).

Referring still to FIG. 3d, to ensure the long term operation of the vibrator screen 710, a conveyor 750 can be used to convey at least some of the separated impurities away from the firewood processor 300. The impurities may be conveyed to a container 760 for impurities. The conveyor 750 may be comprised by the firewood processor 300, or an arrangement can be formed of the firewood processor 300 and a separate conveyor 750. Preferably, at least part of the conveyor 750 is arranged below the vibrator screen 710. Thus, the impurities fall through the openings 720 of the vibrator screen 710 onto the conveyor 750. When operating, to conveyor 750 conveys the impurities away and ensures sufficient free space below the vibrator screen 710 also in long term use of the firewood processor 300.

In addition to aforementioned cleaning, the vibrator screen 710 may be arranged to facilitate the movement of the processed wood (920, 925, 930) on the vibrator screen 710. To facilitate the movement, the vibrator screen in an embodiment is arranged to vibrate in at least a somewhat vertical direction.

More specifically, in an embodiment the processed wood (920, 925, 930) is arranged to move along the vibrator screen 710 in a longitudinal direction Sx2 (see FIG. 3d). The direction Sx2 may be substantially horizontal or it may form an angle of at most 45 degrees (or at most 15 degrees) with a horizontal plane. The direction Sx2 may be parallel to the longitudinal direction of the longitudinal elements 730. Furthermore, the vibrator screen 710 is preferably configured to vibrate in a direction that is (i) perpendicular to the longitudinal direction Sx2 and (ii,a) vertical or (ii,b) forms an angle of a most 45 degrees with a vertical direction. This direction is later referred to as "somewhat vertical direction".

In an embodiment, the vibrator screen does not vibrate in the longitudinal direction Sx2. Thus, in that embodiment, the vibrator screen 710 is configured to vibrate only in the aforementioned somewhat vertical direction.

However, in another embodiment, the vibrator screen 710 is configured to vibrate also in the longitudinal direction Sx2. Therein, the vibrator screen 710 is configured to vibrate also in the aforementioned somewhat vertical direction. However, for facilitating the movement of the processed firewood, it may be beneficial that the amplitude of the vibration in the longitudinal direction Sx2 is less than the amplitude of the vibration in the somewhat vertical direction.

The vibrator screen may be arranged to vibrate in such a way that only one end of the vibrator screen vibrates, while the other end is pivotally connected to a frame of the firewood processor. Thus, the vibration may have a maximum vibration amplitude at a location. Preferably, the means 705 for vibrating the vibrator screen is configured to vibrate the vibration screen 710 in such a way that the maximum vibration amplitude in the aforementioned direction (the somewhat vertical direction) is at least 1 mm; optionally at most 100 mm. The maximum amplitude in this direction may be between 3 mm and 50 mm.

In addition or alternatively, the means 705 for vibrating the vibrator screen may be configured to vibrate the vibration screen 710 in such a way that the vibration frequency in the aforementioned direction (the somewhat vertical direction) is from 2 Hz to 50 Hz. Preferably both the vibration amplitude and the vibration frequency in the somewhat vertical direction, i.e. the direction that is (i) perpendicular to the longitudinal direction Sx2 and (ii,a) vertical or (ii,b) forms an angle of a most 45 degrees with a vertical direction, are within the aforementioned ranges.

In case the firewood processor 300 does not comprise the vibrator screen 710, preferably, the firewood processor 300 comprises a firewood conveyor 360 configured to convey firewood-ready pieces 920 from the splitting part 500 to a storage. In case the firewood processor 300 comprises the vibrator screen 710, preferably, the firewood processor 300 comprises a firewood conveyor 360 configured to convey clean firewood 930 from the vibrator screen 710 to a storage. As above, the firewood conveyor 360 can be integrated with the firewood processor 300, or a separate conveyor 360 can be used for the purpose. Thus, alternatively, an arrangement comprises the firewood processor 300 and the separate firewood conveyor 360.

The following examples summarize some embodiments.

Examples

101. A firewood processor (300), comprising
a saw (410), arranged to cut and separate a log (900, 900b, 900a) from wood (990),
means (330) for feeding wood for the saw (410),
a splitting chute (510), arranged to receive at least a part of the log (900, 900a),
a splitting wedge (600) arranged to split the log (900, 900a), of which at least part is arranged in the splitting chute (510), into pieces (910, 920, 925),
a pressure plate (515) arranged to support the log (900, 900a) while splitting the log (900, 900a),
means (520) for moving the pressure plate (515) and/or the splitting wedge (600) towards each other in such a way that the log (900, 900a) or another log arranged in between the pressure plate (515) and the splitting wedge (600) is configured to be split by said movement, and
optionally, means for moving the log (900, 900b) from the saw (410) to the splitting chute (510),
wherein
the splitting wedge (600) is arranged to split the log (900, 900a), of which at least part is arranged in the splitting chute (510), into an intermediate split log (910) and at least one firewood-ready piece (920), the firewood processor (300) further comprising
a returning element (530) configured to return the intermediate split log (910) back to the splitting chute (510) for further splitting,
a protector (310, 420) configured to be in an open position and a closed position, wherein
 in the closed position, the protector (310, 420) is arranged to limit an interior of the firewood processor (300), such as the interior of a splitting unit (500) comprising the splitting chute (510) or the interior of a cutting unit (400) comprising the saw (410), the protector (310, 420) arranged to protect the user of the firewood processor (300), e.g. by preventing the user of the firewood processor (300) from pushing his hands or other body parts into the interior of the firewood processor (300) and
 in the open position, the protector (310, 420) is arranged to allow the user of the firewood processor to handle at least one of the wood (990), the log (900), and the intermediate split log (910), and
a controller (320), wherein
the firewood processor (300) is configured, in response to a control signal from the controller (320), to engage the means (520) for moving the pressure plate (515) and/or the splitting wedge (600) towards each other and to split the log (900) or the intermediate split log (910) and
the firewood processor (300) is, after splitting the log (900) and without further control signals from the controller (320), configured to automatically return the intermediate split log (910), using the returning element (530), to the splitting chute (510).

102. The firewood processor (300) of example 101, comprising
a press (520) arranged to press the log (900) along the splitting chute (510) against the splitting wedge (600) to split the log (900).

103. The firewood processor (300) of the example 101 or 102, wherein
the controller (320) is arranged to be used by an operator of the firewood processor with only one hand.

104. The firewood processor (300) of any of the examples 101 to 103, comprising
a protector position sensor (315, 415) configured to detect the position of the protector (310, 420), and
only when the protector (310, 420) is in the closed position, the firewood processor (300) is arranged to engage at least one such a tool of which operation would be dangerous to a user, if the protector (310, 420) was in the open position; such tools including at least one of
the means (520) for moving the pressure plate (515) and/or the splitting wedge (600) towards each other,
the returning element (530) arranged to automatically return the intermediate split log (910) to the splitting chute (510),
the saw (410), and
the means (330) for feeding wood (990) for the saw (410).

105. The firewood processor (300) of any of the examples 101 to 104, comprising
a control unit (350) configured to control at least the means (520) for moving the pressure plate (515) and/or the splitting wedge (600) towards each other and
a sensor (340) for detecting the presence of the intermediate split log (910) and configured to send a signal indicative of the presence of the intermediate split log (910) to the control unit (350), wherein
the control unit (350) is arranged to
receive the signal indicative of the presence of the intermediate split log (910) from the sensor (340),
determine the presence of the intermediate split log (910) using the signal indicative of the presence of the intermediate split log (910), and
automatically re-engage the means (520) for moving the pressure plate (515) and/or the splitting wedge (600) towards each other, whereby
the firewood processor (300) is configured to automatically and without further user-given control signals from the controller (320) further split the intermediate split log (910).

106. The firewood processor (300) of any of the examples 101 to 105, wherein
the splitting wedge (600) is arranged to split the log (900), of which at least part is arranged in the splitting chute (510), into the intermediate split log (910) and at least two, preferably at least three, firewood-ready pieces (920).

107. The firewood processor (300) of the example 106, wherein
the splitting wedge (600) is arranged to split the log (900) in such a way that
none of the firewood-ready pieces (920) is left in between the center of another firewood-ready piece (920) produced by the same splitting and the center of the intermediate split log (910).

108. The firewood processor (300) of any of the examples 101 to 107, comprising
a plate (610) having a first side (615) and an opposite second side (617), wherein
the firewood wedge (600) comprises a main wedge (602) configured to separate the intermediate split log (910) from the log (900), the main wedge (602) having a first side and an opposite second side, wherein the intermediate split log (910) is configured to pass the main wedge (602) on the first side of the main wedge (602),
the first side (615) of the plate (610) is configured to receive the intermediate split log (910) during and/or after splitting the log (900), and
the splitting wedge (600) further comprises at least one, preferably at least two, firewood wedges (605) arranged (i) on the second side of the main wedge (602) and (ii) at an angle with respect to the tangent plane of the second side of the main wedge (602) at the point from which the firewood wedge (605) protrudes, whereby
during splitting the log (900),
the intermediate split log (910) is arranged to be left on the first side (615) of the plate (610),
on the second side (of the main wedge (602), the firewood wedge (605) is or the firewood wedges (605) are configured to split the other part of the log (900) into at least two, preferably at least three, firewood-ready pieces (920), and
the firewood-ready pieces (920) are arranged to be left on the second side (617) of the plate (610).

109. The firewood processor (300) of the example 108, wherein
at least part of the first side (615) of the plate (610) is concave, and
an end view of the main wedge (602), as seen from the longitudinal direction of the splitting chute (510), is substantially similar to the same end view of the plate (610), whereby
the concave part of the first side (615) of the plate (610) forms a channel (620) for receiving the intermediate split log (910), wherein the channel (620) for receiving the intermediate split log (910) is configured to receive the intermediate split log (910) during and/or after splitting the log (900).

110. The firewood processor (300) of the example 109, wherein
the returning element (530) is arranged in or on the channel (620) for receiving the intermediate split log (910), and
the shape of the cross section of the returning element (530) is adapted to the shape of the cross section of the channel (620) for receiving the intermediate split log (910), whereby
the returning element (530) is configured to remove at least large impurities, such as bark, from the channel (620) for receiving the intermediate split log (910).

111. The firewood processor (300) of the example 110, wherein
the returning element (530) comprises resilient material (532) arranged at least on the boundary of the returning element (530), wherein
the resilient material (532) is
suitable for sealing the returning element (530) to the channel (620) for the receiving intermediate split log (910) and
suitable for moving debris, bark, sawdust, and other impurities along the channel for receiving the intermediate split log (910), whereby
the returning element (530) is arranged to remove also small impurities, such as sawdust, from the channel (620) for receiving the intermediate split log (910).

112. The firewood processor (300) of any of the examples 108 to 111, wherein the splitting chute (510) extends in a longitudinal direction between a first end and a second of the splitting chute (510), wherein the splitting wedge (600) is arranged closer to the first end of the splitting chute (510) than to the second end of the splitting chute (510), and (A)

the splitting wedge (600) is arranged in such a location that all parts of the splitting wedge are located from the first end of the splitting chute (510) in the longitudinal direction and away from the splitting chute (510) such that the closest distance between the splitting wedge (600) and the splitting chute (510) is at most 5 cm, OR (B)

the splitting wedge (600) extends from the first end of the splitting chute (510) and away from the splitting chute (510), OR (C)

at least a part of the splitting wedge (600) is arranged in between the first end and the second end of the splitting chute (510) and (C,i)

the distance of the part of the splitting wedge (600) that is arranged in between the ends of the splitting chute (510) and the first end of the splitting chute (510) is at most 10 cm or (C,ii)

the splitting chute (510) widens towards the first end of the splitting chute (510).

113. The firewood processor (300) of any of the examples 108 to 112, wherein the firewood processor (300) is configured such that the means (520) for moving the pressure plate (515) and/or the splitting wedge (600) towards each other can only be engaged when (A)

the splitting wedge (600) is detached from the firewood processor (300) or arranged in a position where is not arranged to split a log or (B)

the splitting wedge (600) and the splitting chute (510) are mutually oriented in such a way that a normal projection of a firewood wedge (605) of the splitting wedge (600), the projection of the firewood wedge (605) projected onto a plane having a surface normal parallel to the longitudinal direction of the splitting chute (510) and projected in the longitudinal direction of the splitting chute (510), intersects at an intersection the normal projection of the splitting chute (510), the normal projection of the splitting chute (510) projected onto the same plane and in the same direction as the projections of the firewood wedge (605);

optionally also a part of the normal projection of the firewood wedge (605) of the splitting wedge (600) is arranged a distance (d) apart from the intersection, wherein the distance (d) extends from the intersection along the firewood wedge (605) in a direction that forms an angle of at least 90 degrees with the opening direction of the splitting chute (510) and the distance (d) is at least 15 mm.

114. The firewood processor (300) of any of the examples 108 to 113, wherein the position of the splitting wedge (600) with respect to the splitting chute (510) is fixed or at least temporarily fixable to only one such location where the splitting wedge (600) is configured to split a log (900) or variable in such a way that the splitting wedge (600) can be (i) moved to various positions with respect to the splitting chute (510) in at least an opening direction of the splitting chute (510) and (ii) at least temporarily fixed to said position, and in the fixed position, in the one location where to the splitting wedge (600) can be fixed, or in all the positions to which the splitting wedge (600) can be moved and temporarily fixed, the splitting wedge (600) and the splitting chute (510) are mutually oriented in such a way that a normal projection of a firewood wedge (605) of the splitting wedge (600), the projection of the firewood wedge (605) projected onto a plane having a surface normal parallel to the longitudinal direction of the splitting chute (510) and projected in the longitudinal direction of the splitting chute (510), intersects at an intersection the normal projection of the splitting chute (510), the normal projection of the splitting chute (510) projected onto the same plane and in the same direction as the projections of the firewood wedge (605), and a part of the normal projection of the firewood wedge (605) of the splitting wedge (600) is arranged a distance (d) apart from the intersection, wherein the distance (d) extends from the intersection along the firewood wedge (605) in a direction that forms an angle of at least 90 degrees with the opening direction of the splitting chute (510) and the distance (d) is at least 15 mm.

115. The firewood processor (300) of any of the examples 100-114, wherein the splitting wedge (600) is at least temporarily fixable with respect to the splitting chute (510) to only one such location where the splitting wedge (600) is configured to split a log (900) and the splitting wedge (600) is detachable from the firewood processor (300) without breaking at least one of the firewood processor (300) and the splitting wedge (600);

optionally, the splitting wedge (600) or another splitting wedge is at least temporarily fixable with respect to the splitting chute (510) to another location wherein in the other location the splitting wedge (600) is not configured to split a log.

116. The firewood processor (300) of any of the examples 100-115, comprising a support (430) arranged to support the cut log (900, 900b) after the log (900, 900b) has been cut from wood (990), means (430, 440) for preventing the movement of the cut log (900, 900b) to the splitting chute (510) at a first time, and (i) means for transferring (445a, 445b) the cut log (900, 900b) to the splitting chute (510) or (ii) means (445a, 445b) for allowing the cut log (900, 900b) to move to the splitting chute (510) at a second time, wherein the second time is different from the first time.

117. The firewood processor (300) of example 116, wherein at least part of the support (430) arranged to support the cut log (900, 900b) forms an angle of at most 15 degrees with a horizontal plane and the firewood processor (300) comprises an actuator (445*b*) configured to move the cut log (900, 900*b*) along the support (430) arranged to support the cut log (900, 900*b*) towards the splitting chute (510).

118. The firewood processor (300) of any of the examples 100 to 117, wherein
  a log (900, 900*b*) is arranged to move from the saw (410) to the splitting chute (510) in at least a direction that (i) is horizontal or (ii) forms an angle of at most 60 degrees with a horizontal direction.

119. The firewood processor (300) of any of the examples 100-118 or an arrangement comprising the firewood processor (300) of any of the examples 100 to 118, the firewood processor (300) or the arrangement further comprising
  a wood conveyor (330) configured to convey uncut wood (990) to the saw (410).

120. The firewood processor (300) of any of the examples 100-119, an arrangement comprising the firewood processor (300) of any of the examples 100 to 119, or an arrangement comprising the arrangement of example 119, the firewood processor (300) or the arrangement further comprising
  a firewood conveyor (360) configured to convey firewood-ready pieces (920), optionally after cleaning, to storage.

121. The firewood processor (300) of any of the examples 100-120, or the arrangement of the example 119 or 120, comprising
  means for transferring the at least one firewood-ready piece (920) away from the splitting wedge (600)—such as a vibrator screen (710), a roll conveyor or a plate—configured to transfer the at least one firewood-ready piece (920) away from the splitting wedge (600), wherein the means for transferring is arranged to such a location that the means for transferring is configured to receive the at least one firewood-ready piece (920),
  two walls (715) in such a way that at least part of the means for transferring is arranged in between the walls (715) and the walls (715) are arranged to limit the movement of firewood, whereby the walls (715) and the means for transferring, in combination, form a chute suitable for moving firewood-ready pieces (920), whereby
  firewood (920) is arranged to move in a controlled manner in the chute formed by the walls (715) and the means for transferring, and firewood (920) can be collected from an end of the chute formed by the walls (715) and the means for transferring.

122. The firewood processor (300) or the arrangement of example 121, wherein
  the firewood processor (300) is arranged to produce only one layer of firewood-ready pieces (925) pieces and the means for transferring the at least one firewood-ready piece (920) is arranged to receive this at least one piece (925) arranged in only one layer.

199. The firewood processor (300) of any of the examples 101-122, comprising
  a vibrator screen (710) configured to separate impurities, such as bark, sawdust, and/or debris, from the firewood-ready pieces (920) of the log (900) to obtain clean firewood (930), and
  means (705) for vibrating the vibrator screen (710), wherein
  the vibrator screen (710) is arranged to such a location that the vibrator screen (710) is configured to receive the firewood-ready pieces (920) of the log (900).

200. The firewood processor (300) of any of the examples 108 to 122, comprising
  a vibrator screen (710) configured to separate impurities, such as bark, sawdust, and/or debris, from the firewood-ready pieces (920) of the log (900) to obtain clean firewood (930), and
  means (705) for vibrating the vibrator screen (710), wherein
  the vibrator screen (710) is arranged below the plate (610) whereby the vibrator screen (710) is configured to receive the firewood-ready pieces (920) of the log (900).

201. A firewood processor (300), comprising
  a saw (410), arranged to cut and separate a log (900, 900*b*, 900*a*) from wood (990),
  means (330) for feeding wood to the saw (410),
  a splitting chute (510), arranged to receive at least a part of the log (900, 900*a*),
  a splitting wedge (600) arranged to split the log (900, 900*a*), of which at least part is arranged in the splitting chute (510), into pieces (910, 920, 925),
  a pressure plate (515) arranged to support the log (900, 900*a*) while splitting the log (900, 900*a*),
  means (520) for moving the pressure plate (515) and/or the splitting wedge (600) towards each other in such a way that the log (900, 900*a*) or another log arranged in between the pressure plate (515) and the splitting wedge (600) is configured to be split by said movement, and
  optionally, means for moving the log (900, 900*b*) from the saw (410) to the splitting chute (510),
  the firewood processor (300) further comprising
  a vibrator screen (710) configured to separate impurities, such as bark, sawdust, and/or debris, from the pieces of the log (910, 920, 925) to obtain clean firewood (930), and
  means (705) for vibrating the vibrator screen (710), wherein
  the vibrator screen (710) is arranged to such a location that the vibrator screen (710) is configured to receive the pieces of the log (910, 920, 925).

202. The firewood processor (300) of any of the examples 199 to 201, comprising
  a press (520) arranged to press the log (900, 900*a*) along the splitting chute (510) against the splitting wedge (600) to split the log (900, 900*a*).

203. The firewood processor (300) of any of the examples 199 to 202, wherein
  (A)
  the vibrator screen (710) limits openings (720), through which the impurities are arranged to run, the openings (720) having a length (Lo) and a width (Do), wherein the length (Lo) is greater than or equal to the width (Do), and
  (B)
  the width (Do) of at least one opening is greater than 1 mm, and/or
  the splitting wedge (600) is arranged to split a log (900, 900*a*) into at least firewood-ready pieces (920) having a width (D) of at most a maximum width and the width (Do) of each opening is less than 70% of the maximum width, and/or
  the width (Do) of each opening is less than 100 mm.

204. The firewood processor (300) of any of the examples 199 to 203, wherein
  the vibrator screen (710) comprises at least two longitudinal elements (730), such as rods or bars, each longitudinal element (730) extending most in its longitudinal direction, an angle between the longitudinal directions of any two of the longitudinal elements (730) is at most 10 degrees, whereby the longitudinal elements (730) are substantially parallel, and two neighboring longitudinal elements are arranged a distance (Do) away from each other, whereby an opening (720) or one of the openings (720) is left in between the two neighboring longitudinal elements (730).

205. The firewood processor (300) of example 204, wherein a distance (Do) between the two neighboring longitudinal elements, as measured in a direction perpendicular to a longitudinal direction of one of the two neighboring longitudinal elements (730), is from 1 mm to 100 mm.

206. The firewood processor (300) of example 204 or 205, wherein the longitudinal elements (730) are horizontal or their longitudinal direction forms an angle of at most 45 degrees with a horizontal plane, the vibrator screen (710) further comprising a transversal element (740) connecting two or more of the longitudinal elements (730) in such a way that the top surface of the transversal element (740) is arranged below the top surfaces of at least two longitudinal elements (730) it connects.

207. The firewood processor (300) of the example 206, wherein the top surface of the transversal element (740) is arranged at least 5 mm below the top surfaces of at least two longitudinal elements (730) it connects.

208. The firewood processor (300) of any of the examples 199 to 207, wherein the vibrator screen (710) is configured to separate impurities from the pieces of the log (910, 920, 925) to obtain clean firewood (930) in such a way that during cleaning the impurities are configured to drop through at least an opening (720) of the vibrator screen (710) downwards and clean firewood (930) is arranged to stay on the vibrator screen (710).

209. The firewood processor (300) of the example 208, comprising two walls (715), wherein at least part of the vibrator screen (710) is arranged in between the walls (715) in such a way that the walls (715) and the vibrator screen (710) in combination form a chute suitable for moving processed firewood (910, 920, 925, 930), wherein the walls (715) are arranged to limit the movement of processed firewood (910, 920, 925, 930), and the bottom of the chute suitable for moving processed firewood (910, 920, 925, 930) comprises at least part of the vibrator screen (710).

210. The firewood processor (300) of the example 208 or 209, wherein the firewood processor (300) is configured to move the log (900, 900a) during splitting and the processed firewood (910, 920, 925, 930) on the vibrator screen (710) is arranged to be moved at least by the movement of the log (900, 900a) during the splitting.

211. The firewood processor (300) of the example 210, wherein the splitting chute (510) extends in a first longitudinal direction (Sx1), whereby, during said splitting, the firewood processor (300) is configured to move the log (900, 900a) in the first longitudinal direction (Sx1), and the vibrator screen (710) comprises at least two longitudinal elements (730), such as rods or bars, each longitudinal element (730) extending in its longitudinal direction, wherein an angle between any two longitudinal elements (730) is at most 10 degrees, whereby the longitudinal elements (730) are substantially parallel, each two neighboring longitudinal elements (730) are arranged a distance (Do) away from each other, whereby an opening (720) or one of the openings (720) is left in between each two neighboring longitudinal elements (730), the opening (720) or openings (720) extending in the average in a second longitudinal direction (Sx2), wherein the projection of the first longitudinal direction (Sx1) on a horizontal plane runs in a first horizontal direction, the projection of the second longitudinal direction (Sx2) on a horizontal plane runs in a second horizontal direction, and (i) the first horizontal direction is parallel to the second horizontal direction or (ii) the angle between the first horizontal direction and the second horizontal direction is at most 30 degrees;

preferably, a distance between the two neighboring longitudinal elements (730), as measured in a direction perpendicular to a longitudinal direction (730) of one of the two neighboring longitudinal elements (730), is from 1 mm to 100 mm.

212. The firewood processor (300) of any of the examples 208 to 211, wherein the processed firewood (910, 920, 925, 930) on the vibrator screen (710) is arranged to be moved only by at least one of the movement of the log (900, 900a) during the splitting, gravity, and vibration of the vibration screen (710).

213. The firewood processor (300) of any of the examples 199 to 212, wherein processed firewood (910, 920, 925, 930) is arranged to move on the vibrator screen (710) in a longitudinal direction (Sx2), wherein the longitudinal direction is substantially horizontal or forms an angle of at most 45 degrees with a horizontal plane, and the means (705) for vibrating the vibrator screen (710) is configured to vibrate the vibrator screen (710) with a vibration amplitude and a vibration frequency in a direction that is (i) perpendicular to the longitudinal direction and (ii,a) vertical or (ii,b) forms an angle of a most 45 degrees with a vertical direction (Sz).

214. The firewood processor (300) of the example 213, wherein the means (705) for vibrating the vibrator screen (710) is configured to vibrate the vibration screen (710) in such a way that the maximum vibration amplitude of the vibrator screen (710) in the direction is at least 1 mm, optionally at most 100 mm.

215. The firewood processor (300) of the example 213 or 214, wherein the means (705) for vibrating the vibrator screen (710) is configured to vibrate the vibration screen (710) in such a way that the vibration frequency of the vibrator screen (710) in the direction is from 2 Hz to 50 Hz.

216. The firewood processor (300) of any of the examples 199 to 215, wherein the firewood processor (300) is arranged to produce only one layer of pieces of log (920, 925) and the vibrator screen (710) is arranged to receive these pieces of log (920, 925) arranged in only one layer.

217. The firewood processor (300) of any of the examples 199 to 216, or an arrangement comprising the firewood processor (300) of any of the examples 199 to 216, the firewood processor (300) or the arrangement further comprising
a conveyor (750) for impurities, of which at least part is arranged below the vibrator screen (710), wherein
the conveyor (750) for impurities is arranged to convey at least some of the separated impurities away from the firewood processor (300), e.g. to a container (360) for impurities.

218. The firewood processor (300) of any of the examples 199 to 217, the arrangement of example 217, or an arrangement comprising the firewood processor (300) of any of the examples 199 to 217, the firewood processor (300) or the arrangement further comprising
a firewood conveyor (360) configured to convey clean firewood (930) from the vibrator screen (710) to a storage.

219. The firewood processor (300) of any of the examples 199 to 218, wherein
the vibrator screen (710) is closer to ground level than the splitting chute (510).

The invention claimed is:
1. A firewood processor, comprising
a saw, arranged to cut and separate a log from wood,
means for feeding wood for the saw,
a splitting chute, arranged to receive at least a part of the log,
a splitting wedge arranged to split the log, of which at least part is arranged in the splitting chute, into pieces,
a pressure plate arranged to support the log while splitting the log, and
a press for moving the pressure plate relative to the splitting wedge in such a way that the log or another log arranged in between the pressure plate and the splitting wedge is configured to be split by said movement, wherein
the splitting wedge is arranged to split the log, of which at least part is arranged in the splitting chute, into at least one intermediate split log and at least one firewood-ready piece, the firewood processor further comprising:
a returning plate configured to return the intermediate split log back to the splitting chute for further splitting,
a protector configured to be in an open position and a closed position, and
a protector position sensor configured to detect a position of the protector, wherein
in the closed position, the protector is arranged to limit an interior of the firewood processor and arranged to protect a user from moving parts of the firewood processor; and
in the open position, the protector is arranged to allow the user to handle at least one of the wood, the log, and the intermediate split log, and
the firewood processor is, after splitting the log, without a user-given control signal or user-given control signals from a controller, and only when the protector is in the closed position, configured to automatically return the intermediate split log, using the returning plate, to the splitting chute.

2. The firewood processor of claim 1, comprising
a control unit configured to control at least the press and
a sensor for detecting a presence of the intermediate split log and configured to provide the control unit with a signal indicative of the presence of the intermediate split log, wherein
the control unit is arranged to
receive the signal indicative of the presence of the intermediate split log from the sensor,
determine the presence of the intermediate split log using the signal indicative of the presence of the intermediate split log, and
automatically re-engage the press, whereby
the firewood processor is configured to automatically further split the intermediate split log.

3. The firewood processor of claim 1, comprising
a plate having a first side and an opposite second side, wherein
the firewood wedge comprises a main wedge configured to separate the intermediate split log from the log, the main wedge having a first side and an opposite second side, wherein the intermediate split log is configured to pass the main wedge on the first side of the main wedge,
the first side of the plate is configured to receive the intermediate split log during and/or after splitting the log, wherein
at least part of the first side of the plate is concave, whereby
the concave part of the first side of the plate forms a channel for receiving the intermediate split log, wherein the channel for receiving the intermediate split log is configured to receive the intermediate split log,
the returning plate is arranged in or on the channel for receiving the intermediate split log, and
the shape of the cross section of the returning plate is adapted to the shape of the cross section of the channel for receiving the intermediate split log, whereby
the returning plate is configured to remove at least large impurities, such as bark, from the channel for receiving the intermediate split log.

4. The firewood processor of the claim 3, wherein
the returning plate comprises a resilient material arranged at least on a boundary of the returning plate, wherein
the resilient material is
suitable for sealing the returning plate to the channel for the receiving intermediate split log; and
suitable for moving debris, bark, sawdust, and other impurities along the channel for receiving the intermediate split log, whereby
the returning plate is arranged to remove also small impurities, such as sawdust, from the channel for receiving the intermediate split log.

5. The firewood processor of claim 1, wherein
the splitting wedge is at least temporarily fixable with respect to the splitting chute to only a location in the firewood processor where the splitting wedge is configured to split a log; and
the splitting wedge is detachable from the firewood processor without breaking at least one of the firewood processor and the splitting wedge.

6. The firewood processor of the claim 1, comprising
a support arranged to support the cut log after the log has been cut from wood, and
means for preventing the movement of the cut log to the splitting chute at a first time, wherein the firewood processor is configured to move the cut log to the splitting chute at a second time, wherein the second time is different from the first time.

7. The firewood processor of claim 6, wherein
at least part of the support arranged to support the cut log forms an angle of at most 15 degrees with a horizontal plane, which is perpendicular to a vertical direction, and
the firewood processor comprises an actuator configured to move the cut log along the support arranged to support the cut log towards the splitting chute.

8. The firewood processor of claim 1, wherein
the firewood processor is automated such that
when a previous log has been fully split, the subsequent log is moved to the splitting chute.

9. The firewood processor of the claim 1, comprising
a second protector such that
only when the second protector is in the closed position, the firewood processor is arranged to engage the saw.

10. The firewood processor of the claim 1, comprising
a vibrator screen configured to separate impurities from firewood to obtain clean firewood, wherein
the vibrator screen is arranged to such a location that the vibrator screen is configured to receive the firewood-ready piece.

11. A The firewood processor of claim 1, further comprising
a vibrator screen configured to separate impurities from the pieces of the log to obtain clean firewood, wherein
the firewood processor is arranged to produce only one layer of non-overlapping pieces of log,
the vibrator screen is arranged to such a location that
the vibrator screen is configured to receive the pieces of the log such that the pieces of log are arranged in only one layer also on the vibrator screen, and
the processed firewood on the vibrator screen is arranged to be moved by the movement of the log during the splitting
the firewood processor is configured to move the log during splitting, whereby
the processed firewood on the vibrator screen is arranged to be moved at least by the movement of the log during the splitting.

12. The firewood processor of claim 11, wherein
the firewood processor is arranged to produce only one layer of non-overlapping pieces of log and the vibrator screen is arranged to receive these pieces of log such that these pieces of log are arranged in only one layer also on the vibrator screen.

13. The firewood processor of the claim 11, wherein
the vibrator screen comprises at least two longitudinal elements each longitudinal element extending most in its longitudinal direction,
an angle between the longitudinal directions of any two of the longitudinal elements is at most 10 degrees, whereby the longitudinal elements are substantially parallel,
two neighboring longitudinal elements are arranged a distance away from each other, whereby an opening is left in between the two neighboring longitudinal elements,
the longitudinal elements are horizontal or their longitudinal direction forms an angle of at most 45 degrees with a horizontal plane, the vibrator screen further comprising
a transversal element connecting two or more of the longitudinal elements in such a way that
the top surface of the transversal element is arranged below the top surfaces of at least two longitudinal elements it connects.

14. The firewood processor of the claim 11, wherein
the top surface of the transversal element is arranged at least 5 mm below the top surfaces of at least two longitudinal elements it connects.

15. The firewood processor of the claim 11, wherein
the length of the vibrator screen is at most 2 m.

16. The firewood processor of the claim 11, wherein
processed firewood is arranged to move on the vibrator screen in a longitudinal direction, wherein the longitudinal direction is substantially horizontal or forms an angle of at most 45 degrees with a horizontal plane, and
wherein the vibrator screen is configured to vibrate with a vibration amplitude and a vibration frequency in a direction that is (i) perpendicular to the longitudinal direction and (ii,a) vertical or (ii,b) forms an angle of a most 45 degrees with a vertical direction.

17. The firewood processor of the claim 16, wherein
the vibrator screen is configured to vibrate in such a way that a maximum vibration amplitude of the vibrator screen in the direction is at least 1 mm.

18. The firewood processor of the claim 16, wherein
the vibrator screen is configured to vibrate in such a way that the vibration frequency of the vibrator screen in the direction is from 2 Hz to 50 Hz.

19. The firewood processor of the claim 11, wherein
the splitting chute is comprised by a splitting unit of the firewood processor, and
the vibrator screen is arranged to such a location that the pieces of log are arranged to move from the splitting unit to the vibrator screen only by at least one of (i) the movement of a log during the splitting and (ii) gravity.

20. The firewood processor of the claim 11 further comprising
a conveyor for impurities, of which at least part is arranged below the vibrator screen, wherein
the conveyor for impurities is arranged to convey at least some of the separated impurities away from the firewood processor.

21. The firewood processor of claim 13, wherein the longitudinal elements comprise rods or bars.

22. The firewood processor of claim 17, wherein the maximum vibration amplitude of the vibrator screen in the direction is at most 100 mm.

23. The firewood processor of claim 1, further comprising a spare wedge, the spare wedge being configured to be fixable to the firewood processor to a location in which the spare wedge is not configured to split the log.

* * * * *